United States Patent
Iwasaki et al.

(10) Patent No.: US 10,505,396 B2
(45) Date of Patent: Dec. 10, 2019

(54) WIRELESS POWER RECEIVING APPARATUS

(71) Applicant: Rohm Co., Ltd., Kyoto (JP)

(72) Inventors: Tatsuya Iwasaki, Kyoto (JP); Takeshi Nozawa, Kyoto (JP); Isao Yamamoto, Kyoto (JP); Kazuyoshi Yasuoka, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 328 days.

(21) Appl. No.: 15/353,338

(22) Filed: Nov. 16, 2016

(65) Prior Publication Data

US 2017/0149291 A1 May 25, 2017

(30) Foreign Application Priority Data

Nov. 20, 2015 (JP) ................................. 2015-228017
Nov. 20, 2015 (JP) ................................. 2015-228018
Oct. 28, 2016 (JP) ................................. 2016-211335

(51) Int. Cl.
*H02J 50/80* (2016.01)
*H02J 50/12* (2016.01)
*H02J 7/02* (2016.01)

(52) U.S. Cl.
CPC .............. *H02J 50/12* (2016.02); *H02J 7/025* (2013.01); *H02J 50/80* (2016.02)

(58) Field of Classification Search
CPC ............. H02J 50/12; H02J 50/80; H02J 7/025
See application file for complete search history.

(56) References Cited

U.S. PATENT DOCUMENTS 5,633,898 A * 5/1997 Kishigami .......... H04L 27/1525
                                              329/300
6,072,427 A * 6/2000 McEwan ................ G01S 7/2806
                                              331/2
7,640,446 B1 * 12/2009 Donovan .................. G06F 1/08
                                              713/322

(Continued)

FOREIGN PATENT DOCUMENTS

JP          2011-211780          10/2011

*Primary Examiner* — Pinping Sun
(74) *Attorney, Agent, or Firm* — Fish & Richardson P.C.

(57) ABSTRACT

A rectifier circuit includes an H-bridge circuit, and rectifies an AC current that flows through a reception antenna. A smoothing capacitor smoothes the output of the rectifier circuit. A demodulator demodulates an FSK-modulated electric power signal. A first comparator compares a voltage $V_{AC1}$ at a first AC input terminal with a first threshold voltage $V_{TH1}$, and generates a first detection signal. A second comparator compares a voltage $V_{AC2}$ at a second AC input terminal with a second threshold voltage $V_{TH2}$, and generates a second detection signal. A clock generating circuit generates a frequency detection clock CLK_OUT that transits according to a predetermined edge type of the first detection signal and a predetermined edge type of the second detection signal. A frequency detection circuit detects the frequency of the frequency detection clock.

24 Claims, 15 Drawing Sheets

(56) References Cited

U.S. PATENT DOCUMENTS

| | | | | |
|---|---|---|---|---|
| 8,156,365 B2* | 4/2012 | Jang | .......................... | G09G 3/20 327/161 |
| 8,873,689 B2* | 10/2014 | Chung | ................... | H03H 11/20 370/395.62 |
| 2004/0090247 A1* | 5/2004 | Jin | ....................... | G01R 23/005 327/60 |
| 2009/0021219 A1* | 1/2009 | Yoda | ........................ | H02J 7/025 320/137 |
| 2011/0096883 A1* | 4/2011 | Bae | ........................ | H04L 7/042 375/359 |
| 2012/0022613 A1* | 1/2012 | Meskens | .............. | A61N 1/3727 607/57 |
| 2013/0026849 A1* | 1/2013 | Ohta | ........................ | G06F 1/12 307/104 |
| 2013/0147279 A1* | 6/2013 | Muratov | ................. | H02J 5/005 307/104 |
| 2013/0154560 A1* | 6/2013 | Walley | ................ | H01M 2/0267 320/108 |
| 2014/0240099 A1* | 8/2014 | Chuang | ................... | H02J 17/00 340/10.5 |
| 2014/0265610 A1* | 9/2014 | Bakker | ................ | H04B 5/0037 307/104 |
| 2015/0207333 A1* | 7/2015 | Baarman | ................ | H02J 5/005 307/104 |
| 2015/0215005 A1* | 7/2015 | Toivanen | ................ | H02J 50/80 455/41.1 |
| 2015/0326142 A1* | 11/2015 | Petras | ..................... | H02J 50/80 307/104 |
| 2015/0326143 A1* | 11/2015 | Petras | ................... | H02M 7/217 363/127 |
| 2015/0349853 A1* | 12/2015 | Bosenko | ................ | H04B 5/02 455/41.2 |
| 2015/0377741 A1* | 12/2015 | Stein | ...................... | G01M 17/02 307/9.1 |
| 2016/0198410 A1* | 7/2016 | Cherniavsky | ..... | H04W 52/0229 370/278 |
| 2016/0336976 A1* | 11/2016 | Onishi | ................ | H04B 1/0475 |
| 2017/0070265 A1* | 3/2017 | Sui | ....................... | H04B 5/0075 |

* cited by examiner

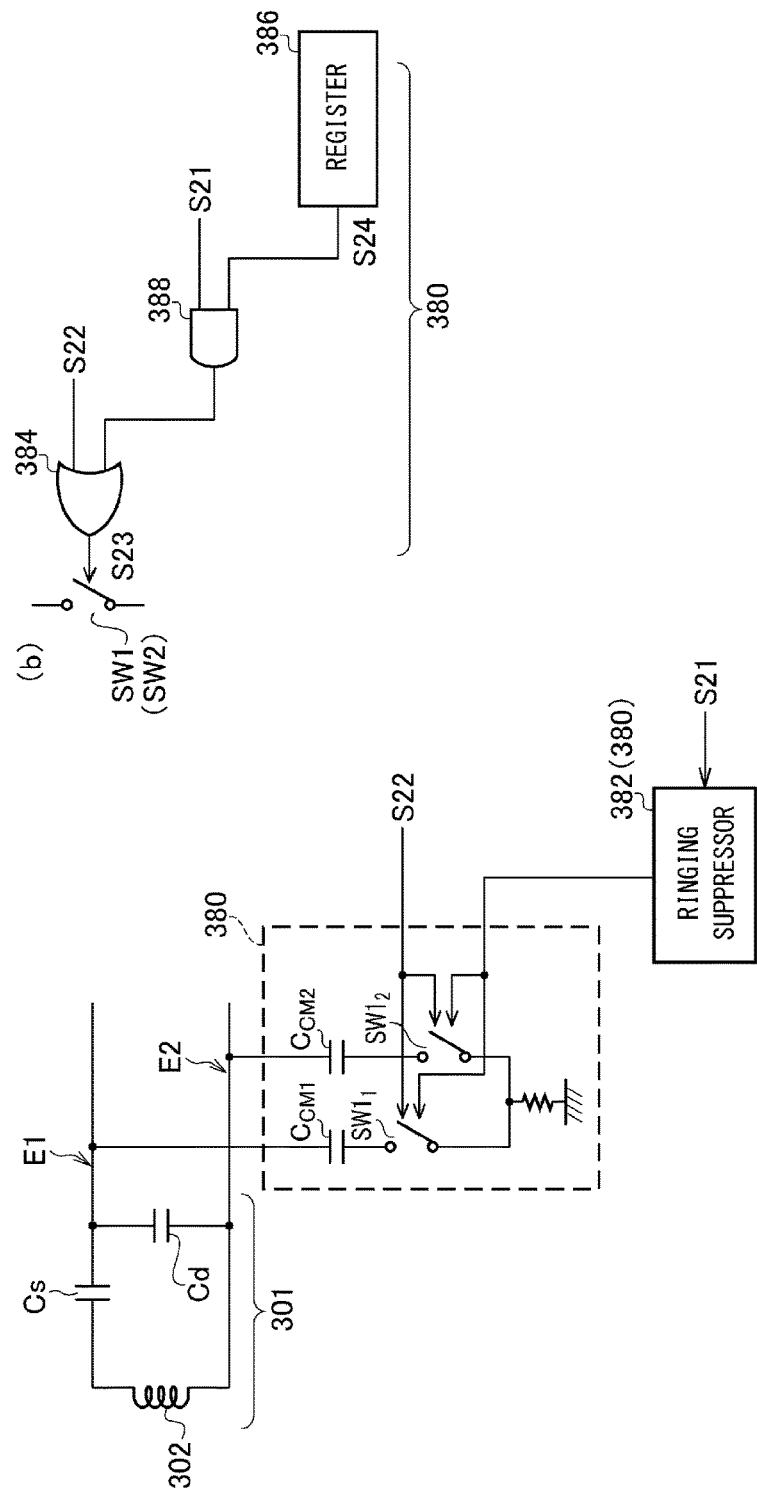

500

WIRELESS POWER RECEIVING APPARATUS

BACKGROUND OF THE INVENTION

1. Field of the Invention

The present invention relates to a wireless power supply technique.

2. Description of the Related Art

In recent years, in order to supply electric power to an electronic device, contactless power transmission (which is also referred to as "contactless power supply" or "wireless power supply") has begun to come into commonplace use. In order to advance the compatibility of products between manufacturers, the WPC (Wireless Power Consortium) has been organized, and the WPC has developed the Qi standard as an international standard.

FIG. 1 is a diagram showing a configuration of a wireless power supply system 100 that conforms to the Qi standard. The power supply system 100 includes a power transmission apparatus 200 (TX: power transmitter) and a power receiving apparatus 300r (RX: power receiver). The power receiving apparatus 300r is mounted on an electronic device, examples of which include cellular phone terminals, smartphones, audio players, game machines, and tablet terminals.

The power transmission apparatus 200 includes a transmission antenna 201, an inverter 204, a controller 206, and a demodulator 208. The transmission antenna 201 includes a transmission coil (primary coil) 202 and a resonance capacitor 203. The inverter 204 includes an H-bridge circuit (full-bridge circuit) or otherwise a half-bridge circuit. The inverter 204 applies a driving signal S1, specifically, in the form of a pulse signal, to the transmission coil 202. This provides a driving current flowing through the transmission coil 202, which generates an electric power signal S2 at the transmission coil 202 in the form of an electromagnetic signal. The controller 206 integrally controls the overall operation of the power transmission apparatus 200. Specifically, the controller 206 controls the switching frequency of the inverter 204 or otherwise the duty ratio or the phase of the switching of the inverter 204 so as to adjust the electric power to be transmitted.

In the Qi standard, a protocol is defined for communication between the power transmission apparatus 200 and the power receiving apparatus 300r, which enables control data S3 to be transmitted from the power receiving apparatus 300r to the power transmission apparatus 200. The control data S3 is transmitted from a reception coil 302 (secondary coil) to the transmission coil 202 in the form of an AM (Amplitude Modulation) modulated signal using backscatter modulation. The control data S3 includes electric power control data (which will also be referred to as a "packet") which indicates an amount of electric power to be supplied to the power receiving apparatus 300r, and data which indicates the particular information for identifying the power receiving apparatus 300r. The demodulator 208 demodulates the control data S3 included in the current or otherwise the voltage applied to the transmission coil 202. The controller 206 controls the inverter 204 based on the power control data included in the control data S3 thus demodulated.

The power receiving apparatus 300r includes the reception coil 302, a rectifier circuit 304, a capacitor 306, a modulator 308, a controller 312, a charger circuit 314, and a demodulator 320. The reception coil 302 receives the electric power signal S2 from the transmission coil 202, and transmits the control data S3 to the transmission coil 202.

The rectifier circuit 304 and the capacitor 306 rectify and smooth a current S4 induced at the reception coil 302 according to the electric power signal S2, thereby converting the current S4 into a DC voltage. The charger circuit 314 charges a secondary battery 102 using electric power supplied from the power transmission apparatus 200.

The controller 312 monitors the amount of electric power received by the power receiving apparatus 300r. The controller 312 generates power control data (a control error value) that indicates electric power to be supplied, based on the monitored value. The modulator 308 modulates the control data S3 including the power control data so as to modulate the coil current that flows through the reception coil 302, thereby modulating the coil current and the coil voltage applied to the transmission coil 202.

Furthermore, the Qi standard allows control data S5 to be transmitted from the power transmission apparatus 200 to the power receiving apparatus 300r. The control data S5 is superimposed on the electric power signal S2 using the FSK (Frequency Shift Keying) method, and transmitted from the transmission coil 202 to the reception coil 302. The control data S5 may include an acknowledgement (ACK) signal that gives notice of reception of the control data S3 and a negative acknowledgement (NACK) signal that gives notice that the control data S3 has not been received.

An FSK modulator 220 is built into the controller 206. The FSK modulator 220 changes the switching frequency of the inverter 204 according to the data to be transmitted. The demodulator 320 arranged on the power receiving apparatus 300r side demodulates the FSK-modulated control data S5.

FIG. 2 is a circuit diagram showing the rectifier circuit 304 and the demodulator 320 investigated by the present inventors. The rectifier circuit 304 is configured as a so-called synchronous rectifier circuit (which is also referred to as the "synchronous detection circuit") including an H-bridge circuit 330, a driver 332, a first comparator 334, a second comparator 336, and a logic circuit 338. The H-bridge circuit 330 includes transistors M1 through M4 and rectifier diodes D1 through D4.

A reception antenna 301 is connected to input terminals AC1 and AC2 of the synchronous rectifier circuit 304. An AC current $I_{AC}$ (S4 in FIG. 1) induced due to the electric power signal S2 flows through the reception antenna 301. The rectifier circuit 304 switches the state $\phi$ of the H-bridge circuit 330 at a timing at which the AC current $I_{AC}$ becomes zero, i.e., at a timing at which the polarity is inverted. Such a switching control operation will be referred to as "zero-current switching". The H-bridge circuit 330 can be switched between the following four states $\phi 1$ through $\phi 4$.

A first state $\phi 1$ in which the first transistor M1 is on, the second transistor M2 is off, the third transistor M3 is off, and the fourth transistor M4 is on.

A second state $\phi 2$ in which the first transistor M1 is off, the second transistor M2 is off, the third transistor M3 is off, and the fourth transistor M4 is off.

A third state $\phi 3$ in which the first transistor M1 is off, the second transistor M2 is on, the third transistor M3 is on, and the fourth transistor M4 is off.

A fourth state $\phi 4$ in which the first transistor M1 is off, the second transistor M2 is off, the third transistor M3 is off, and the fourth transistor M4 is off.

In the second state $\phi 2$ and the fourth state $\phi 4$, the rectifier circuit 304 functions as a diode rectifier circuit.

A first comparator 334 compares a voltage $V_{AC1}$ at the AC1 terminal with a zero-current detection threshold voltage $V_{ZC1}$. A second comparator 336 compares a voltage $V_{AC2}$ at the AC2 terminal with a zero-current detection threshold voltage $V_{ZC2}$. The comparators 334 and 336 are each configured as a hysteresis comparator with a threshold voltage that is switched between two values, i.e., a negative voltage (e.g., −0.2 V) and a voltage in the vicinity of zero (e.g. −2 mV).

The logic circuit 338 controls the state of the H-bridge circuit 330 based on a combination of an output AC1_DET of the first comparator 334 and an output AC2_DET of the second comparator 336. The driver 332 drives the transistors M1 through M4 according to a control signal received from the logic circuit 338. It should be noted that the entire configuration and operation of the rectifier circuit 304 described with reference to FIG. 2 cannot be recognized as a known technique.

FIG. 3 is an operation waveform diagram showing the operation of the rectifier circuit 304. It should be noted that the vertical axis and the horizontal axis shown in the waveform diagrams and the time charts in the present specification are expanded or reduced as appropriate for ease of understanding. Also, each waveform shown in the drawing is simplified or exaggerated for emphasis for ease of understanding.

When the voltage $V_{AC1}$ at the AC1 terminal becomes higher than −2 mV, the AC1_DET signal is switched to the high level. When the voltage $V_{AC1}$ becomes lower than −0.2 V, the AC1_DET signal is switched to the low level. In the same way, when the voltage $V_{AC2}$ at the AC2 terminal becomes higher than −2 mV, the AC2_DET signal is switched to the high level. When the voltage $V_{AC2}$ becomes lower than −0.2 V, the AC2_DET signal is switched to the low level. The logic circuit 338 switches the state of the H-bridge circuit 330 between the first state φ1 through the fourth state φ4 based on the AC1_DET signal and the AC2_DET signal. A predetermined delay may be provided between the level transitions in the AC1_DET signal and the AC2_DET signal and the state transition.

Returning to FIG. 2, description will be made regarding the demodulator 320. The AC2_DET signal has the same frequency as that of the AC current $I_{AC}$, i.e., the frequency of the electric power signal S2. Accordingly, the demodulator 320 counts the number of cycles of the AC2_DET signal so as to detect the frequency of the AC2_DET signal, and performs FSK demodulation. There is symmetry between the AC1 terminal and the AC2 terminal. Thus, the demodulator 320 may perform the FSK demodulation based on the AC1_DET signal.

However, the demodulator 320 shown in FIG. 2 has the following problem. FIGS. 4A and 4B are operation waveform diagrams each showing the operations of the rectifier circuit 304 and the demodulator 320. An FSK_CLK_ID signal is configured as a signal obtained by retiming the AC1_DET signal using an internal clock, and by masking short chattering. The FSK_CLK_ID signal can be recognized as being substantially the same as the AC1_DET signal.

In the wireless power supply operation, in addition to the FSK modulation for communication, the power transmission frequency, the switching duty ratio, or the switching phase is changed in order to adjust the transmitted electric power. As a result, in some cases, large ringing occurs in the voltage $V_{AC1}$ at the AC1 terminal and in the voltage $V_{AC2}$ at the AC2 terminal in the second state φ2 or in the fourth state φ4 in which the H-bridge circuit functions as a diode rectifier circuit.

As shown in FIG. 4B, when the amplitude of such ringing is large, the voltage $V_{AC1}$ ($V_{AC2}$) crosses the threshold voltage $V_{ZC}$ regardless of the zero-crossing of the AC current $I_{AC}$, which changes the level of the AC1_DET signal (or AC2_DET signal). This leads to a problem in that the frequency of the electric power signal S2 does not match the frequency of the AC1_DET1 signal (FSK_CLK_ID signal). This leads to a problem of degraded communication quality and degraded communication stability, and a problem of a degraded bit error rate.

SUMMARY OF THE INVENTION

The present invention has been made in order to solve such a problem. Accordingly, it is an exemplary purpose of an embodiment of the present invention to provide a wireless power receiving apparatus that is capable of suppressing degradation of communication quality and degradation of the bit error rate even if such ringing occurs.

SUMMARY OF THE INVENTION

1. An embodiment of the present invention relates to a wireless power receiving apparatus that receives an electric power signal from a wireless power transmission apparatus. The wireless power receiving apparatus comprises: a reception antenna comprising a reception coil that receives the electric power signal; a rectifier circuit that rectifies an AC current that flows through the reception antenna; a smoothing capacitor that smoothes an output of the rectifier circuit; and a demodulator that demodulates the electric power signal subjected to FSK (Frequency Shift Keying) modulation. The rectifier circuit comprises: an H-bridge circuit comprising a first AC input terminal and a second AC input terminal connected to the reception antenna; and a synchronous rectification controller that controls the H-bridge circuit. The demodulator comprises: a first comparator that compares a voltage at the first AC input terminal with a first threshold voltage, so as to generate a first detection signal; a second comparator that compares a voltage at the second AC input terminal with a second threshold voltage, so as to generate a second detection signal; a clock generating circuit that generates a frequency detection clock that transits according to a given edge of the first detection signal and a given edge of the second detection signal; and a frequency detection circuit that detects a frequency of the frequency detection clock.

By generating the frequency detection clock using the two detection signals that correspond to the voltages at the two AC input terminals, such an arrangement prevents contamination of the frequency detection clock by fluctuation in the detection signal due to ringing. Such an embodiment provides high-precision FSK demodulation even in a situation in which ringing occurs at the AC input terminals, thereby suppressing degradation of communication quality.

Also, the clock generating circuit may generate the frequency detection clock according to a positive edge of the second detection signal and a subsequent negative edge of the first detection signal.

Also, the clock generating circuit may comprise: an inverter that inverts the first detection signal; and a logic circuit that generates the frequency detection clock according to the second detection signal and the first detection signal inverted by the inverter.

Also, the clock generating circuit may perform retiming of the inverted first detection signal and the second detection signal using an internal clock.

Also, the clock generating circuit may further comprise: a first chattering removal circuit that judges that a valid transition has occurred in the first detection signal when the first detection signal remains at the same level over M cycles (M represents an integer of 2 or more) of the internal clock; and a second chattering removal circuit that judges that a valid transition has occurred in the second detection signal when the second detection signal remains at the same level over N cycles (N represents an integer of 2 or more) of the internal clock.

Also, the clock generating circuit may comprise: a first one-shot circuit arranged on a path of the inverted first detection signal; and a second one-shot circuit arranged on a path of the second detection signal. By generating a pulse signal having a predetermined pulse width by means of the one-shot circuit, such an arrangement is capable of performing signal processing according to an edge of the detection signal in a sure manner.

Also, the frequency detection circuit may measure the frequency of the frequency detection clock using the internal clock.

Also, the clock generating circuit may generate the frequency detection clock according to a negative edge of the second detection signal and a subsequent negative edge of the first detection signal.

Also, the synchronous rectification controller may control the bridge circuit based on the first detection signal and the second detection signal.

By configuring the comparator employed in the demodulator and the comparator employed in the rectifier circuit as a shared comparator, such an arrangement allows the circuit area to be reduced.

Also, the wireless power receiving apparatus may conform to the Qi standard.

2. Another embodiment of the present invention also relates to a wireless power receiving apparatus that receives an electric power signal from a wireless power transmission apparatus. The wireless power receiving apparatus comprises: a reception antenna comprising a reception coil that receives the electric power signal; a rectifier circuit that rectifies an AC current that flows through the reception antenna; a smoothing capacitor that smoothes an output of the rectifier circuit; a demodulator that demodulates the electric power signal subjected to FSK (Frequency Shift Keying) modulation; and an auxiliary circuit that shifts a parallel resonance frequency of the reception antenna during reception of an FSK signal.

By adjusting the parallel resonance frequency of the reception antenna, such an arrangement is capable of suppressing the occurrence of ringing. This suppresses degradation of the bit error rate.

Also, the auxiliary circuit may comprise: a first capacitor and a first switch arranged in series between one end of the reception antenna and a ground; a second capacitor and a second switch arranged in series between the other end of the reception antenna and the ground; and a control circuit that controls the first switch and the second switch.

Also, the auxiliary circuit may further comprise a resistor arranged between the ground and a connection node that connects the first switch and the second switch. Such an arrangement is capable of determining the amount by which the parallel resonance frequency is shifted, according to the resistance value of the resistor.

With an embodiment, the wireless power receiving apparatus may further comprise an AM modulator that changes the parallel resonance frequency of the reception antenna according to an AM modulated signal. Also, the auxiliary circuit may control the AM modulator. This suppresses an increase in the circuit area.

Also, the AM modulator may comprise: a first capacitor and a first switch arranged in series between one end of the reception antenna and the ground; and a second capacitor and a second switch arranged in series between the other end of the reception antenna and the ground. Also, the auxiliary circuit may comprise a logic gate that performs logical operation on the AM modulated signal and a reception period signal that indicates a period of reception of the FSK signal. Also, the auxiliary circuit may control the first switch and the second switch based on an output signal of the logic gate.

Also, the rectifier circuit may comprise: an H-bridge circuit that comprises a first AC input terminal and a second AC input terminal connected to the reception antenna; and a synchronous rectification controller that controls the H-bridge circuit. Also, the demodulator may comprise: a first comparator that compares a voltage at the first AC input terminal with a first threshold voltage, so as to generate a first detection signal; a second comparator that compares a voltage at the second AC input terminal with a second threshold voltage, so as to generate a second detection signal; a clock generating circuit that generates a frequency detection clock that transits according to a given edge of the first detection signal and a given edge of the second detection signal; and a frequency detection circuit that detects the frequency of the frequency detection clock.

By generating the frequency detection clock using the two detection signals that correspond to the voltages at the two AC input terminals, such an arrangement is capable of preventing contamination of the frequency detection clock by fluctuation in the detection signal due to ringing. Such an embodiment provides high-precision FSK demodulation even in a situation in which ringing occurs at the AC input terminals, thereby suppressing degradation of the bit error rate.

Also, the clock generating circuit may generate the frequency detection clock according to a positive edge of the second detection signal and a subsequent negative edge of the first detection signal.

Also, the clock generating circuit may comprise: an inverter that inverts the first detection signal; and a logic circuit that generates the frequency detection clock according to the second detection signal and the first detection signal inverted by the inverter.

Also, the clock generating circuit may perform retiming of the inverted first detection signal and the second detection signal using an internal clock.

Also, the clock generating circuit may further comprise: a first chattering removal circuit that judges that a valid transition has occurred in the first detection signal when the first detection signal remains at the same level over M cycles (M represents an integer of 2 or more) of the internal clock; and a second chattering removal circuit that judges that a valid transition has occurred in the second detection signal when the second detection signal remains at the same level over N cycles (N represents an integer of 2 or more) of the internal clock.

Also, the clock generating circuit may comprise: a first one-shot circuit arranged on a path of the inverted first detection signal; and a second one-shot circuit arranged on a path of the second detection signal. By generating the pulse signal having a predetermined pulse width by means of the one-shot circuits, such an arrangement is capable of performing the operation in a sure manner according to an edge of the detection signal.

Also, the frequency detection circuit may measure the frequency of the frequency detection clock using the internal clock.

Also, the clock generating circuit may generate the frequency detection clock according to a negative edge of the second detection signal and a subsequent negative edge of the first detection signal.

Also, the synchronous rectification controller may control the bridge circuit based on the first detection signal and the second detection signal.

By configuring the comparator employed in the demodulator and the comparator employed in the rectifier circuit as a shared comparator, such an arrangement allows the circuit area to be reduced.

Also, the wireless power receiving apparatus may conform to the Qi standard.

It should be noted that any combination of the aforementioned components, any component of the present invention, or any manifestation thereof, may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 13A and 13B are circuit diagrams respectively showing the modulator and the ringing suppressor;

DETAILED DESCRIPTION OF THE INVENTION

Figure 1:
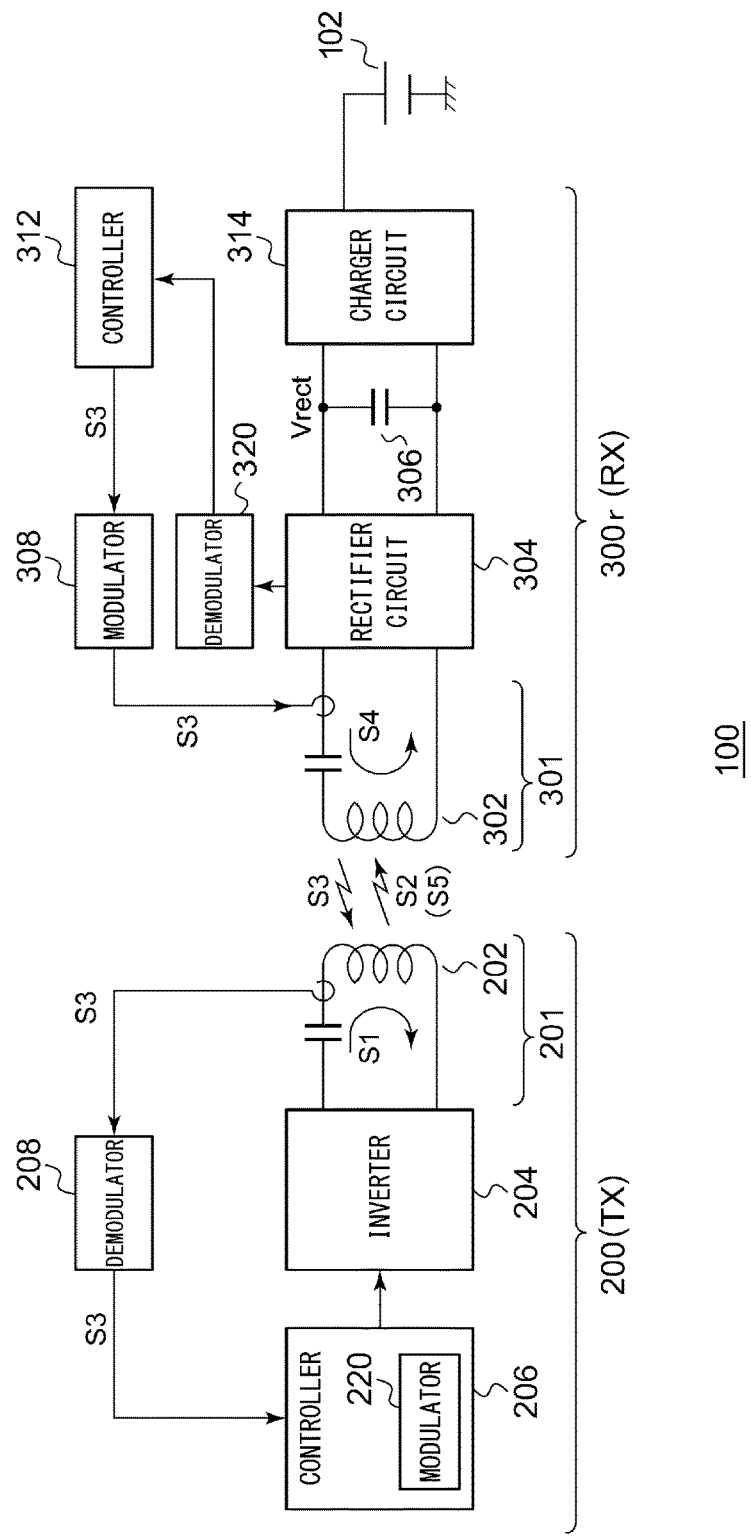
FIG. 1 is a diagram showing a configuration of a wireless power supply system that conforms to the Qi standard.

Description will be made below regarding preferred embodiments according to the present invention with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

First Embodiment

Figure 5:
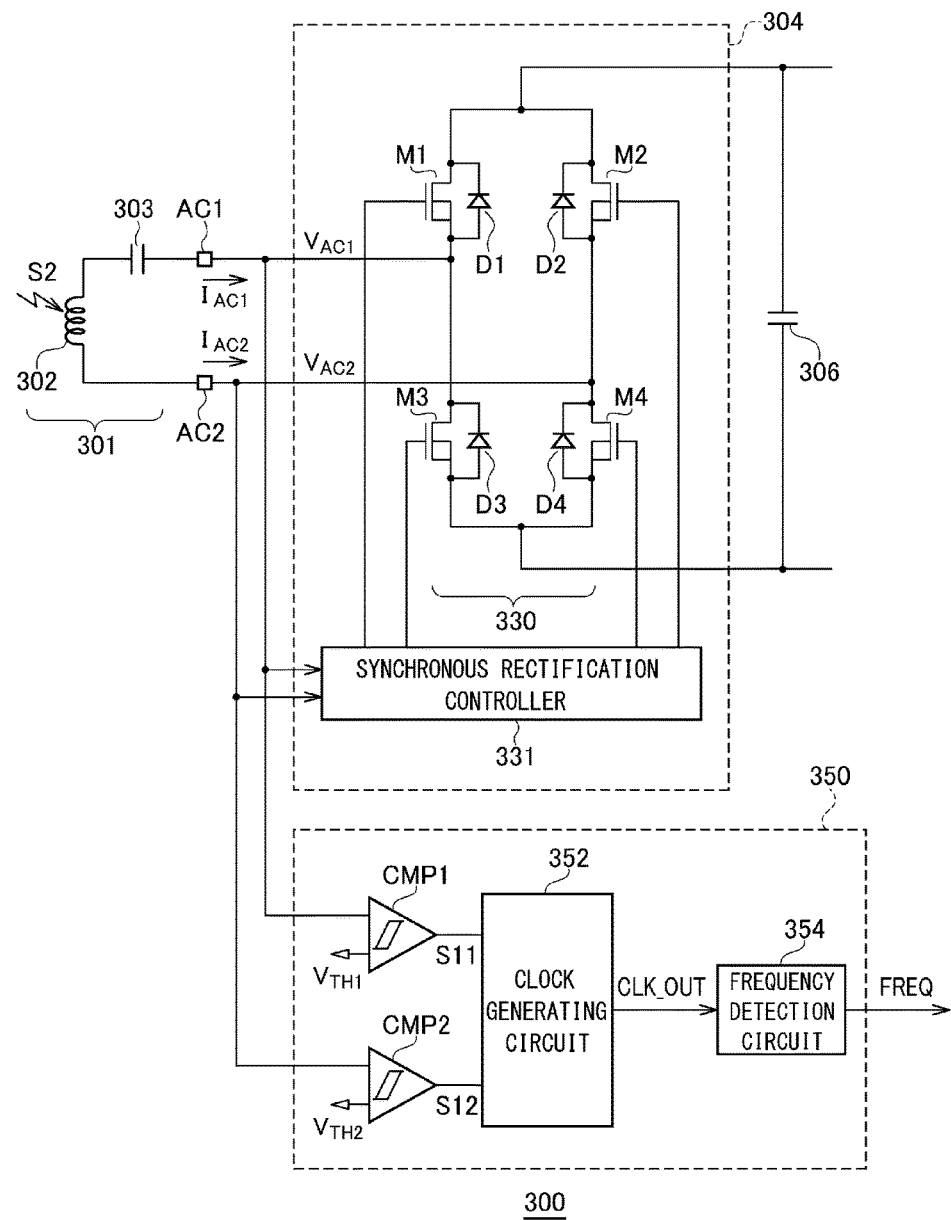
FIG. 5 is a circuit diagram showing a power receiving apparatus including a demodulator according to an embodiment.

FIG. 5 is a circuit diagram showing a power receiving apparatus 300 including a demodulator 350 according to a first embodiment. The power receiving apparatus 300 has the same basic configuration as that described above with reference to FIG. 1.

A reception antenna 301 includes a reception coil 302 that receives an electric power signal S2 and a resonance capacitor 303. A rectifier circuit 304 rectifies an AC current $I_{AC}$ that flows through the reception antenna 301. The rectifier circuit 304 includes an H-bridge circuit 330 including a first transistor M1 through a fourth transistor M4 and rectifier diodes D1 through D4, and a synchronous rectification controller 331 that controls the H-bridge circuit 330. A smoothing capacitor 306 smoothes the output of the rectifier circuit 304.

The electric power signal S2 is configured as a signal that is FSK (Frequency Shift Keying) modulated by a modulator of the power transmission apparatus 200. A demodulator 350 demodulates the FSK signal.

The demodulator 350 includes a first comparator CMP1, a second comparator CMP2, a clock generating circuit 352, and a frequency detection circuit 354. The first comparator CMP1 compares the voltage $V_{AC1}$ at the first AC input terminal (AC1 terminal) with a first threshold voltage $V_{TH1}$, so as to generate a first detection signal S11. Similarly, the second comparator CMP2 compares the voltage $V_{AC2}$ at a second AC input terminal (AC2 terminal) with a second threshold voltage $V_{TH2}$, so as to generate a second detection signal S12. Preferably, the first threshold voltage $V_{TH1}$ and the second threshold voltage $V_{TH2}$ are each set to a negative voltage in the vicinity of 0 V. The first threshold voltage $V_{TH1}$ and the second threshold voltage $V_{TH2}$ may be set to the same voltage. The first comparator CMP1 and the second comparator CMP2 may each be configured as a hysteresis comparator. The threshold voltage $V_{TH1}$ ($V_{TH2}$) may be switched between two values, i.e., two threshold voltages $V_{THH}$ and $V_{THL}$. For example, an arrangement may be made in which $V_{THH}$=-2 mV and $V_{THL}$=-0.2 V.

The clock generating circuit 352 generates a frequency detection clock CLK_OUT that transits according to a predetermined edge type (i.e., a positive edge or otherwise a negative edge) of the first detection signal S11 and a predetermined edge type (i.e., a positive edge or otherwise a negative edge) of the second detection signal.

In the present embodiment, the clock generating circuit 352 generates the frequency detection clock CLK_OUT that transits to a first level (e.g., high level) according to a positive edge of the second detection signal S12, and that transits to a second level (e.g., low level) according to a negative edge of the first detection signal S11 after the transition to the first level.

The frequency detection circuit 354 detects the frequency of the frequency detection clock CLK_OUT, and generates data FREQ that indicates the frequency. The frequency data FREQ is supplied to an unshown digital demodulator.

Figure 6:
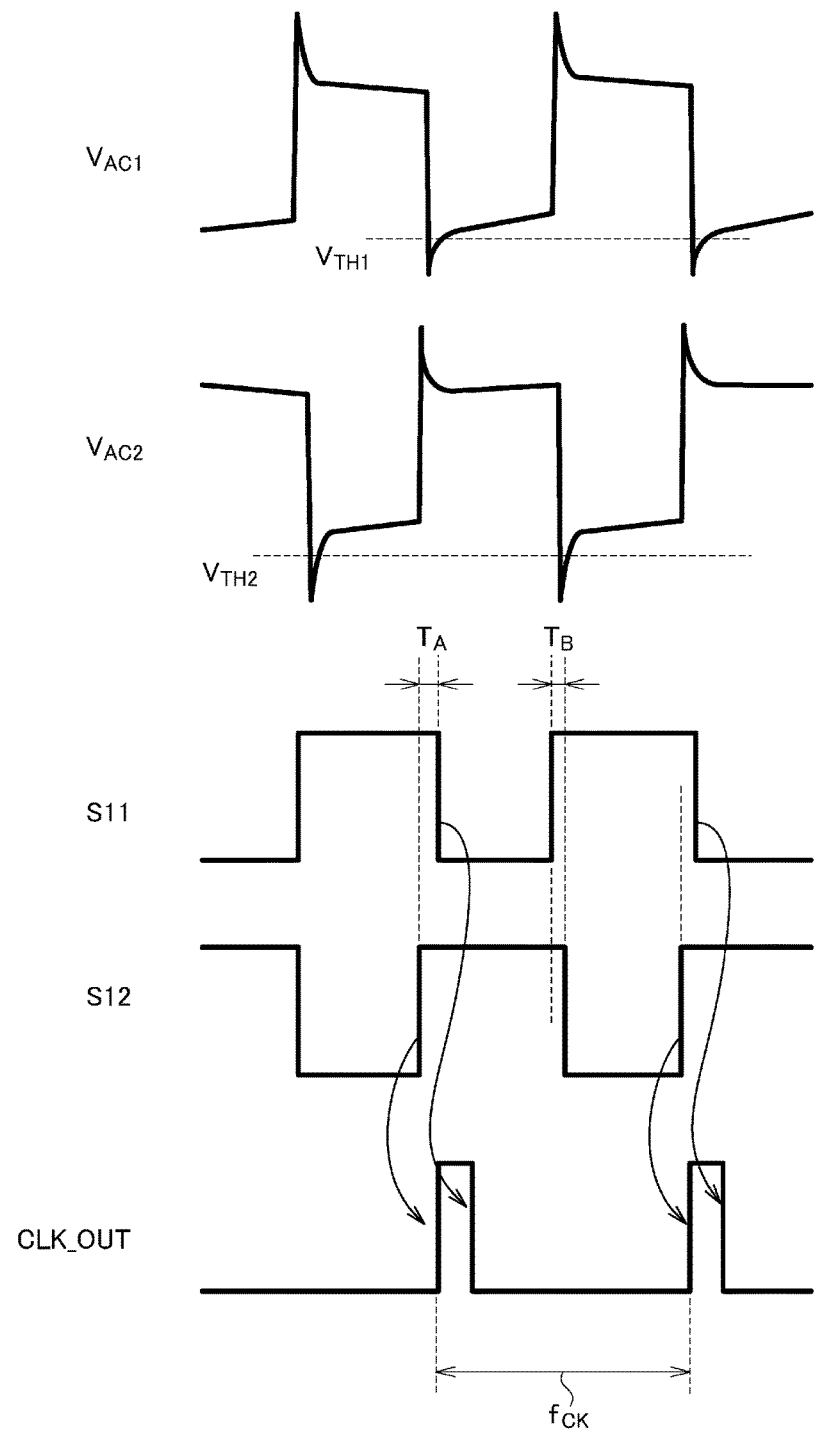
FIG. 6 is an operation waveform diagram showing the operation of the demodulator of the power receiving apparatus shown in FIG. 5.

The above is the basic configuration of the power receiving apparatus 300 according to the embodiment. Next, description will be made regarding the operation thereof. FIG. 6 is an operation waveform diagram showing the operation of the demodulator 350 of the power receiving apparatus 300 shown in FIG. 5. The voltage $V_{AC1}$ at the AC1 terminal is compared with the first threshold voltage $V_{TH1}$, and the first detection signal S11 is generated. Similarly, the voltage $V_{AC2}$ at the AC2 terminal is compared with the second threshold voltage $V_{TH2}$, and the second detection signal S12 is generated.

The clock generating circuit 352 sets the frequency detection clock CLK_OUT to the high level in response to a positive edge of the second detection signal S12. Furthermore, the clock generating circuit 352 sets the frequency detection clock CLK_OUT to the low level in response to a negative edge of the first detection signal S11. The frequency detection circuit 354 measures the frequency (i.e., period) of the frequency detection clock CLK_OUT.

The above is the basic operation of the power receiving apparatus 300.

Let us consider a case in which large ringing occurs in the voltage $V_{AC2}$ in a period $T_4$ immediately after the positive edge of the second detection signal S12. In this case, the level of the second detection signal S12 fluctuates. However, in this period $T_4$, the clock generating circuit 352 does not detect a positive edge of the second detection signal S12. Furthermore, the clock generating circuit 352 does not constantly detect a negative edge of the second detection signal S12. Thus, the frequency detection clock CLK_OUT does not fluctuate.

Moreover, let us consider a case in which large ringing occurs in the voltage $V_{AC1}$ in a period $T_3$ immediately after the positive edge of the first detection signal S11. In this case, the level of the first detection signal S11 fluctuates. However, in this period $T_3$, the clock generating circuit 352 does not detect a negative edge of the first detection signal S11. Furthermore, the clock generating circuit 352 does not constantly detect a positive edge of the first detection signal S11. Thus, the frequency detection clock CLK_OUT does not fluctuate.

As described above, with the demodulator 350, such an arrangement is capable of detecting the frequency of the AC current $I_{AC}$ with high precision even if ringing occurs in the voltage $V_{AC1}$ or $V_{AC2}$.

An aspect of the present invention encompasses various kinds of apparatuses and circuits that can be regarded as a block configuration or a circuit configuration shown in FIG. 5, or otherwise that can be derived from the aforementioned description. That is to say, the present invention is not restricted to a specific circuit configuration. More specific description will be made below regarding an example configuration for clarification and ease of understanding of the essence of the present invention and the circuit operation. That is to say, the following description is by no means intended to restrict the technical scope of the present invention.

Figure 2:
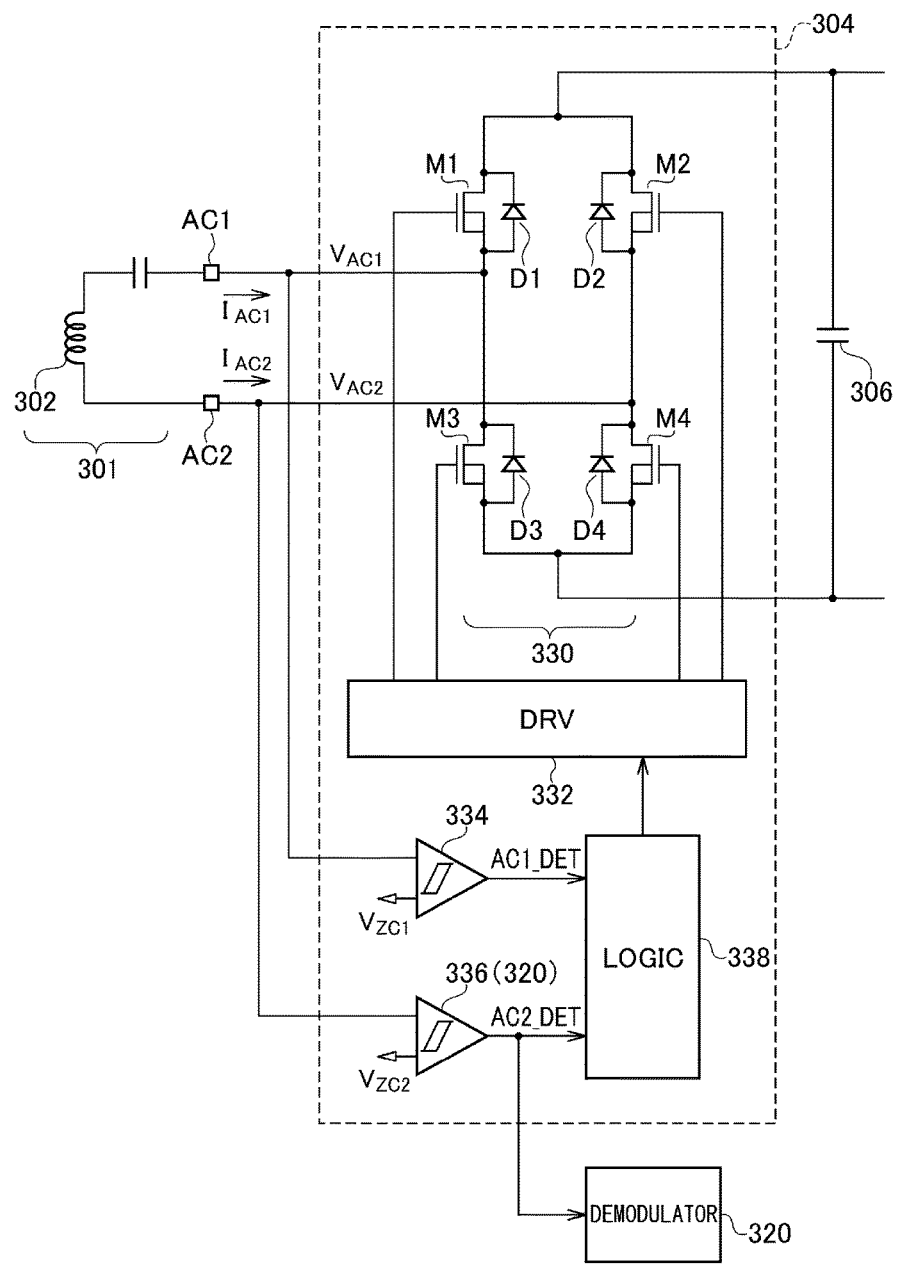
FIG. 2 is a circuit diagram showing a rectifier circuit and a demodulator investigated by the present inventors.
Figure 3:
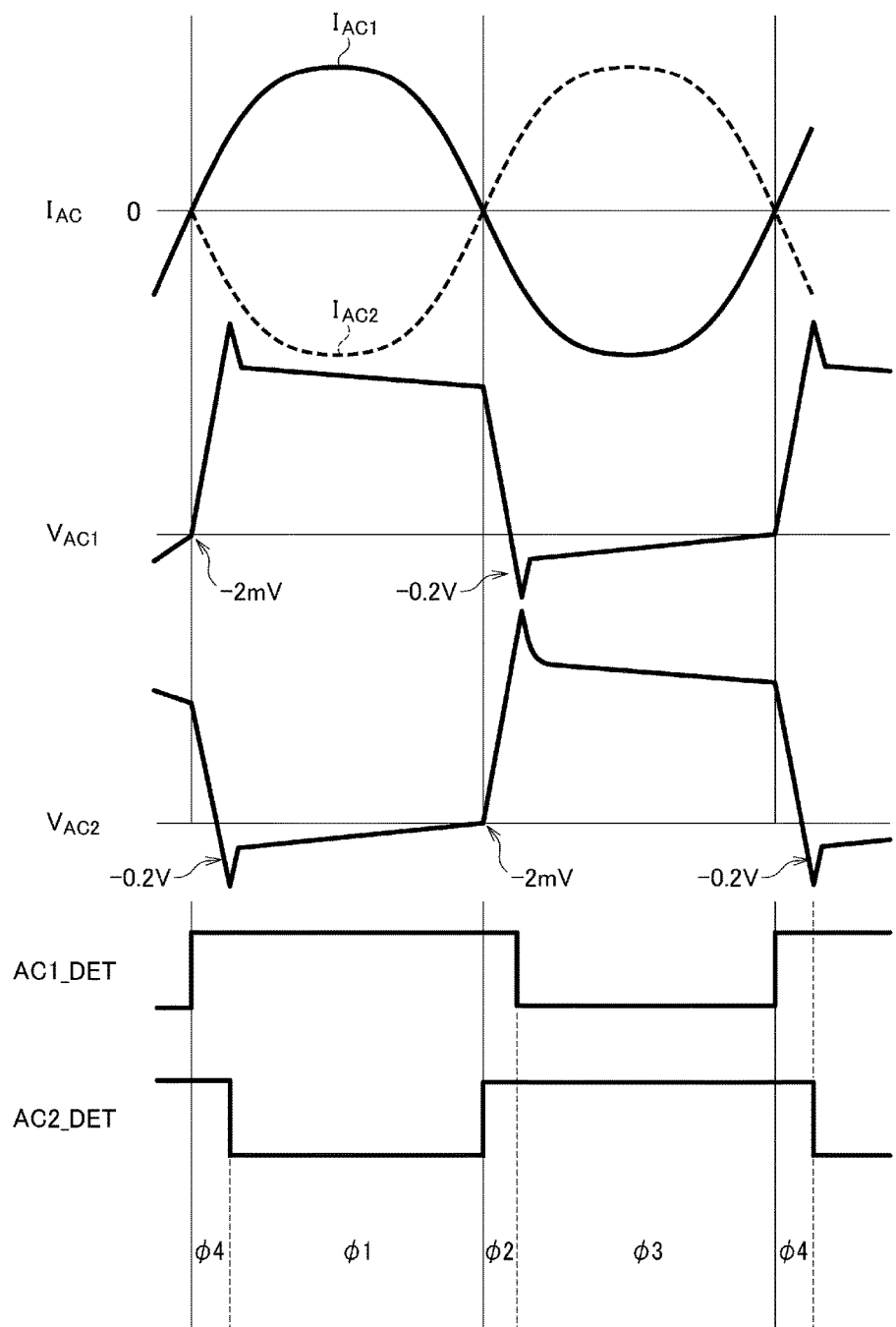
FIG. 3 is an operation waveform diagram showing the operation of the rectifier circuit.
Figure 4A:
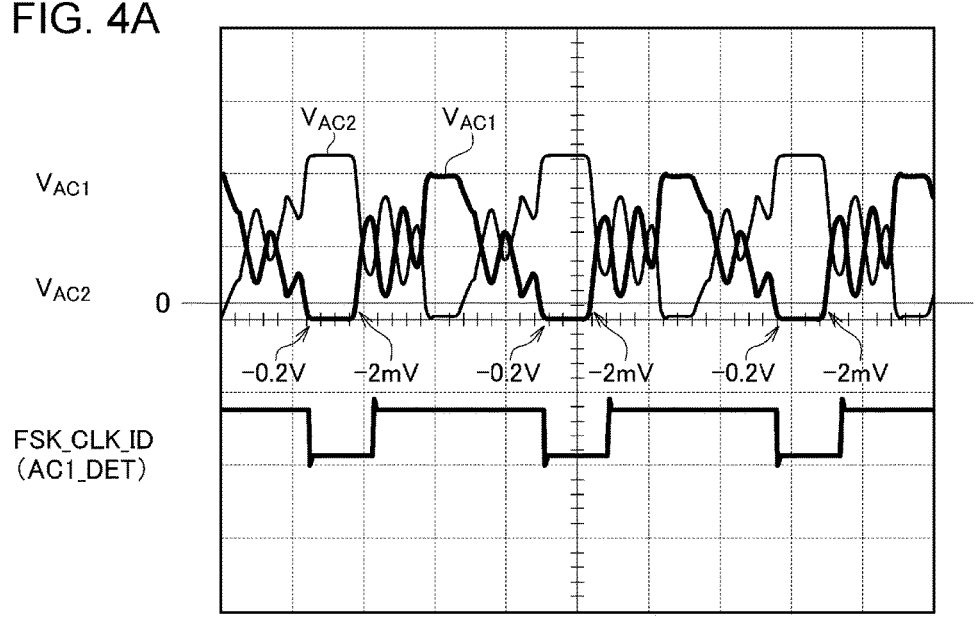
FIGS. 4A and 4B are operation waveform diagrams each showing the operations of the rectifier circuit and the demodulator.
Figure 4B:
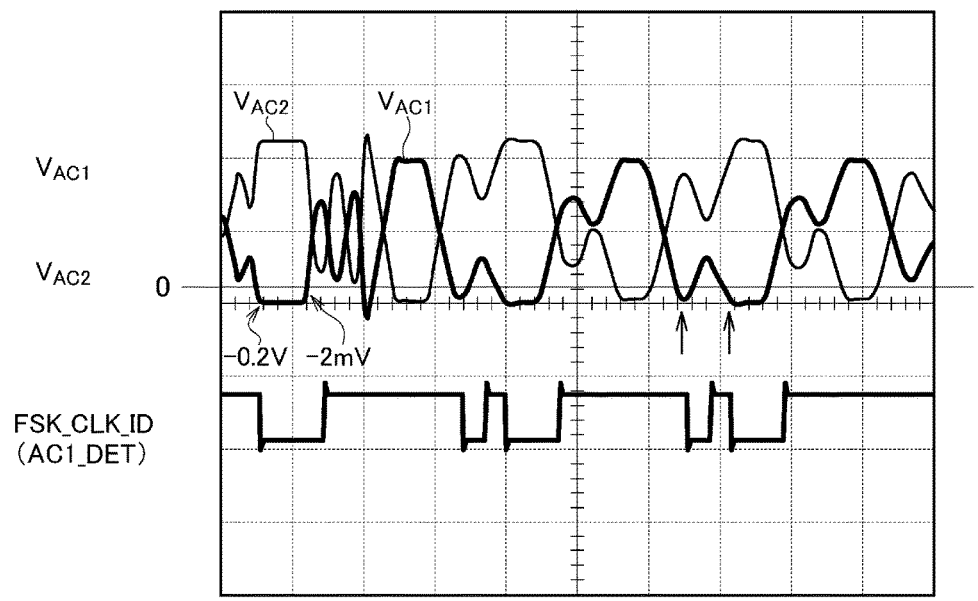
Figure 7:
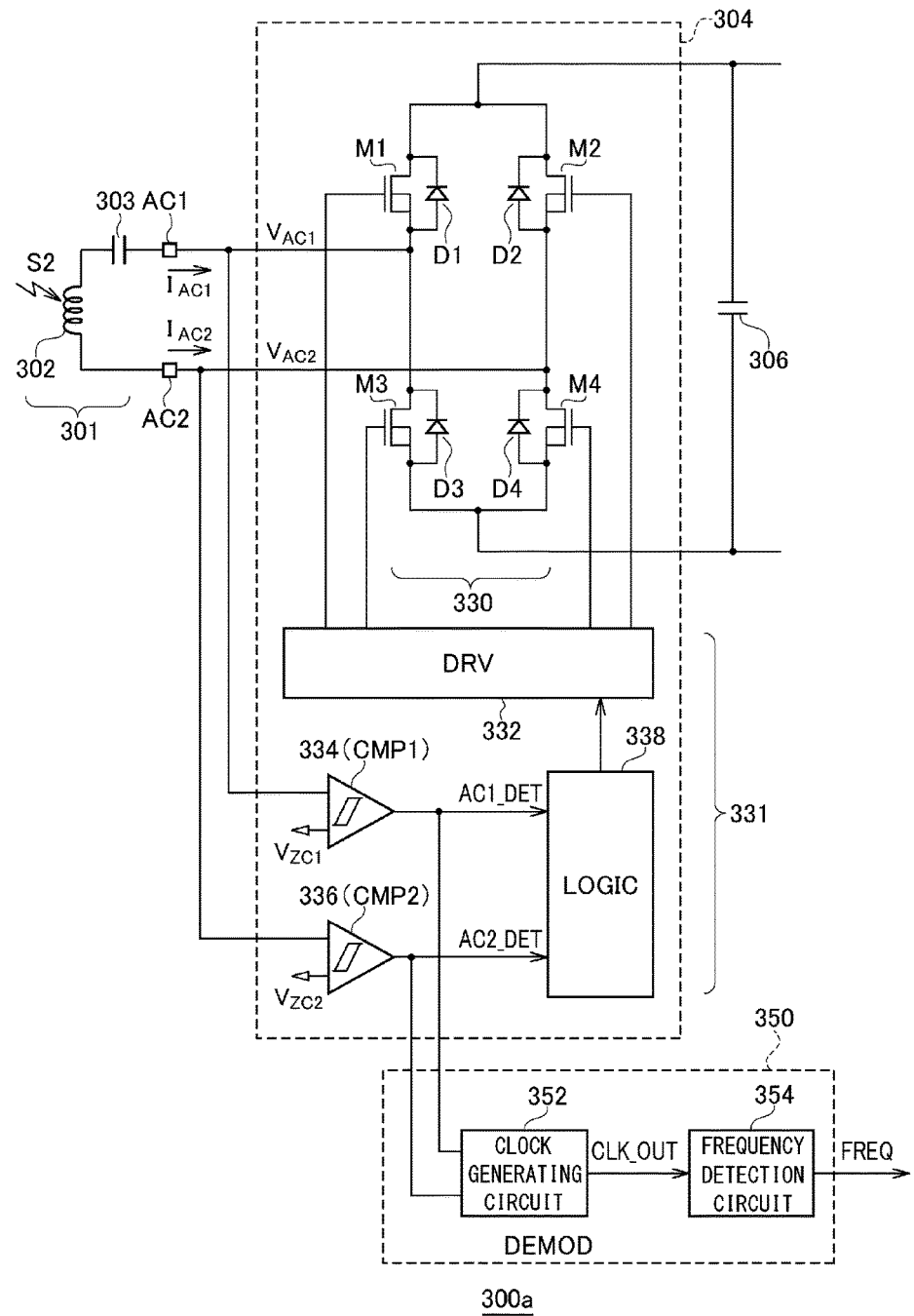
FIG. 7 is a circuit diagram showing a specific example configuration of the power receiving apparatus.

FIG. 7 is a circuit diagram showing a specific example configuration of the power receiving apparatus. In a power receiving apparatus 300a shown in FIG. 7, a synchronous rectification controller 331 performs zero-current switching. Specifically, the synchronous rectification controller 331 includes a driver 332, a first comparator 334, a second comparator 336, and a logic circuit 338. The configuration and the operation of the synchronous rectification controller 331 are the same as those described above with reference to FIG. 2.

With the power receiving apparatus 300a shown in FIG. 7, the first comparator 334 and the second comparator 336, each configured as a zero-current (zero-crossing) detection comparator, are employed as the first comparator CMP1 and the second comparator CMP2 of the demodulator 350. That is to say, the AC1_DET signal is used as the first detection signal S11, and the AC2_DET signal is used as the second detection signal S12.

With such an example configuration, such a pair of comparators are shared by the synchronous rectification controller 331 and the demodulator 350, thereby allowing the circuit area to be reduced.

Figure 8A:
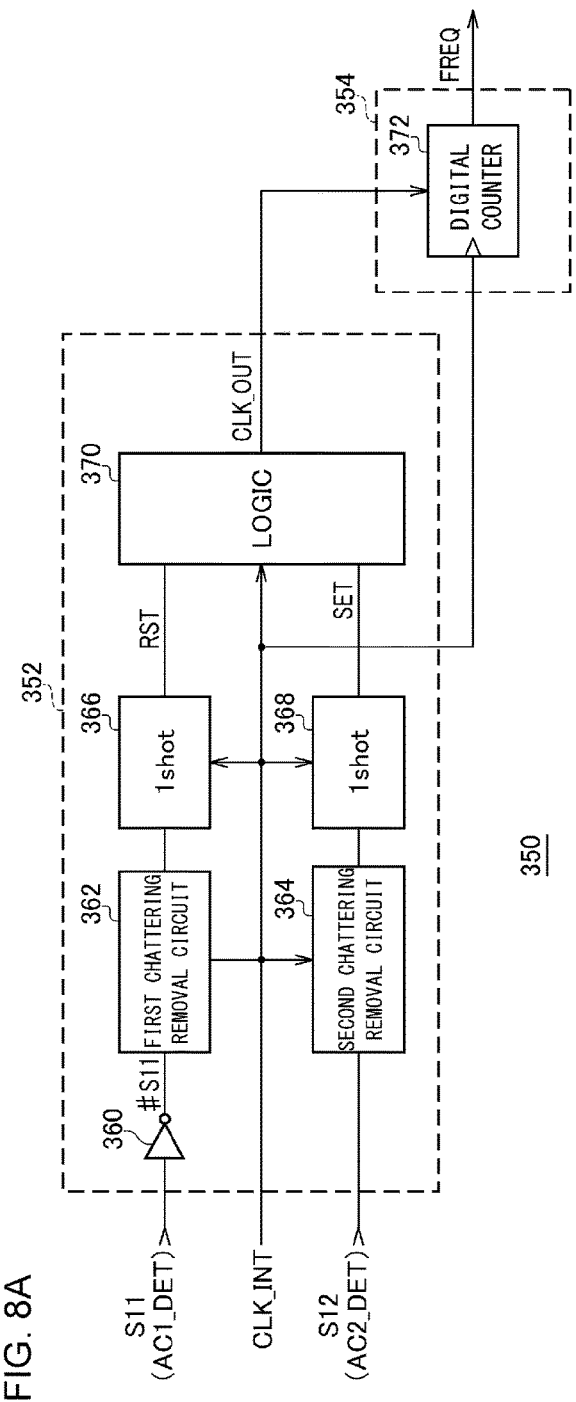
FIGS. 8A and 8B are circuit diagrams each showing a specific example configuration of the demodulator.
Figure 8B:
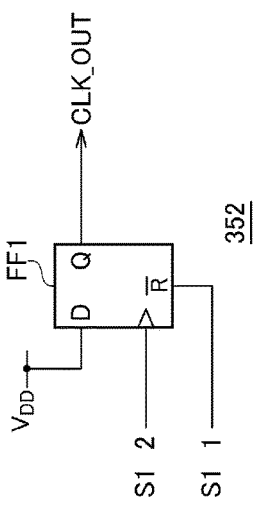

FIGS. 8A and 8B are circuit diagrams each showing a specific example configuration of the demodulator. A clock generating circuit 352 shown in FIG. 8A includes an inverter 360, a first chattering removal circuit 362, a second chattering removal circuit 364, a first one-shot circuit 366, a second one-shot circuit 368, and a logic circuit 370.

The inverter 360 inverts the first detection signal S11. The logic circuit 370 generates the frequency detection clock CLK_OUT according to the second detection signal S12 and the first detection signal #S11 ("#" represents logical inversion) obtained by signal inversion by the inverter. The logic circuit 370 may be configured as an SR flip-flop or an SR latch arranged such that it is set according to one signal from among the second detection signal S12 and the inverted first detection signal #S11, and such that it is reset according to the other signal.

The clock generating circuit 352 may be designed as a synchronous circuit that operates in synchronization with an internal clock CLK_INT. The internal clock CLK_INT is configured to have a frequency that is sufficiently higher than that of the AC current $I_{AC}$. In this case, the clock generating circuit 352 may perform retiming of the inverted first detection signal #S11 and retiming of the second detection signal S12 using the internal clock CLK_INT.

When the inverted first detection signal #S11 remains at the same level throughout M (M represents an integer of 2 or more) cycles of the internal clock CLK_INT, the first chattering removal circuit 362 judges that the transition is valid. Furthermore, when the second detection signal S12 remains at the same level over N (N represents an integer of 2 or more) cycles of the internal clock CLK_INT, the second chattering removal circuit 364 judges that the transition is valid. For example, an arrangement may be made in which M=3 and N=2. The chattering removal circuits 362 and 364 provide synchronization between the detection signals S11 and S12 and the internal clock. The chattering removal circuits 362 and 364 may each be configured as a flip-flop.

The first one-shot circuit 366 is arranged on a path of the inverted first detection signal #S11. The first one-shot circuit 366 generates a reset signal RST which is asserted (e.g., set to the high level) for a predetermined period of time from a positive edge of the inverted first detection signal #S11. The second one-shot circuit 368 is arranged on a path of the second detection signal S12. The second one-shot circuit 368 generates a set signal SET which is asserted (e.g., set to the high level) for a predetermined period of time from a positive edge of the second detection signal S12. The logic circuit 370 is set according to the set signal SET, and is reset according to the reset signal RST. By employing such one-shot circuits, such an arrangement allows the logic circuit 370 to be set and reset in a sure manner.

The frequency detection circuit 354 measures the frequency (period) of the frequency detection clock CLK_OUT using the internal clock CLK_INT. The frequency detection circuit 354 may be configured as a digital counter 372, and may output the count value as the frequency data FREQ.

Also, the clock generating circuit 352 may be configured as an asynchronous circuit that operates directly according to an edge or a change in level of the detection signals S11 and S12 without performing retiming of the detection signals S11 and S12 using the internal clock. FIG. 8B is a circuit diagram showing another example configuration of the clock generating circuit 352. The clock generating circuit 352 includes a flip-flop FF1. The flip-flop FF1 is arranged such that the second detection signal S12 is input to its clock terminal and the first detection signal S11 is input to a negative-logic reset terminal.

Next, description will be made regarding a modification of the power receiving apparatus 300 shown in FIG. 5.

[First Modification]

Figure 9:
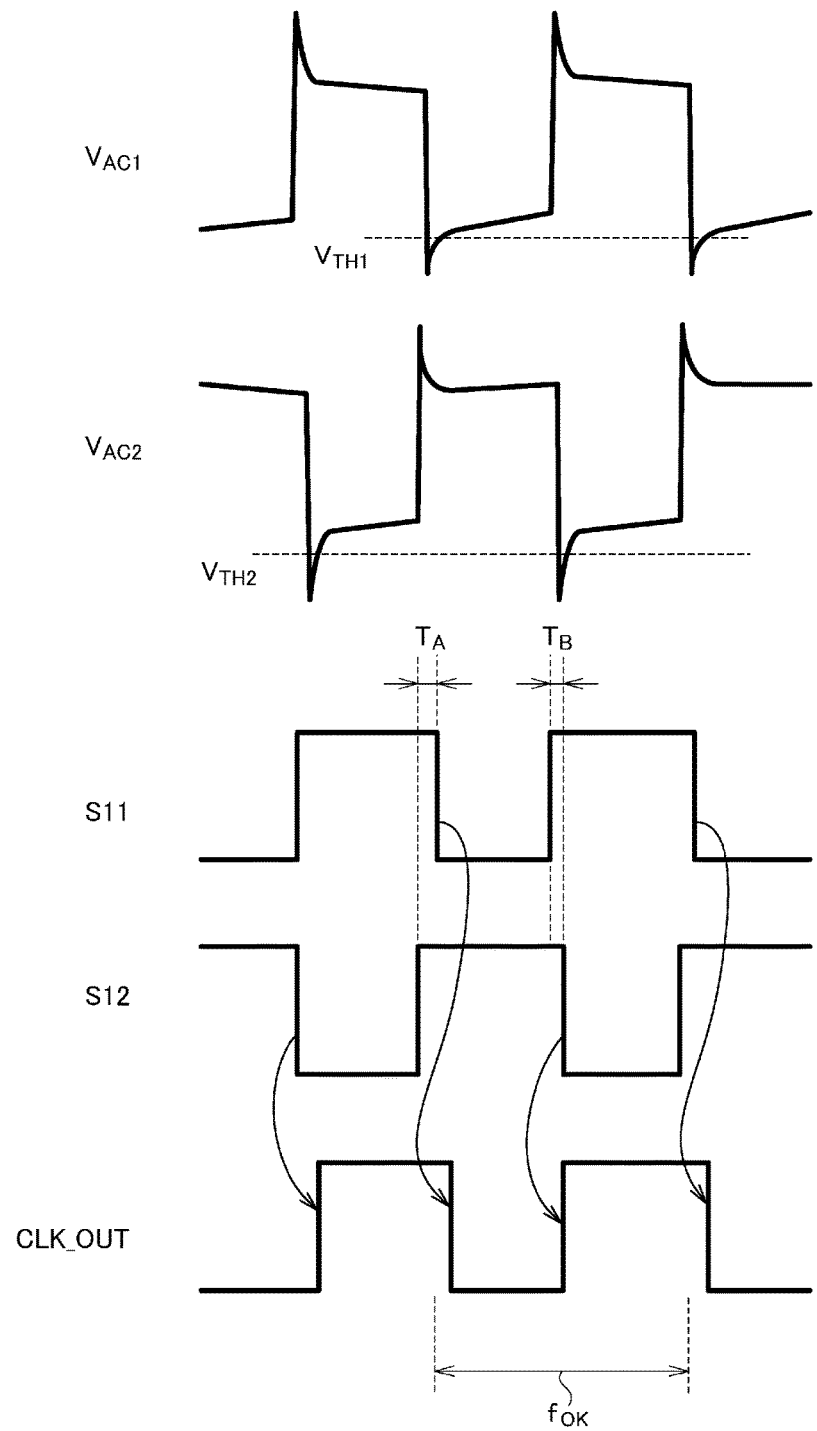
FIG. 9 is an operation waveform diagram showing the operation of a demodulator according to a first modification.

In a first modification, the clock generating circuit 352 generates the frequency detection clock CLK_OUT according to a negative edge of the second detection signal S12 and a subsequent negative edge of the first detection signal S11. FIG. 9 is an operation waveform diagram showing the operation of the demodulator 350 according to the first modification.

Let us consider a case in which large ringing occurs in the voltage $V_{AC2}$ in a period $T_A$ immediately after a positive edge of the second detection signal S12. In this case, the level of the second detection signal S12 fluctuates. However, during this period $T_A$, the clock generating circuit 352 does not detect a negative edge of the second detection signal S12. Furthermore, the clock generating circuit 352 does not constantly detect a positive edge of the second detection signal S12. Thus, in this case, the frequency detection clock CLK_OUT does not fluctuate.

Moreover, let us consider a case in which large ringing occurs in the voltage $V_{AC1}$ in a period $T_3$ immediately after a negative edge of the first detection signal S11. In this case, the level of the first detection signal S11 fluctuates. However, during this period $T_3$, the clock generating circuit 352 does not detect a negative edge of the first detection signal S11. Furthermore, the clock generating circuit 352 does not constantly detect a positive edge of the first detection signal S11. Thus, in this case, the frequency detection clock CLK_OUT does not fluctuate.

As described above, with the demodulator 350, such an arrangement is capable of detecting the frequency of the AC current $I_{AC}$ with high precision even if ringing occurs in the voltage $V_{AC1}$ or $V_{AC2}$.

Figure 10:
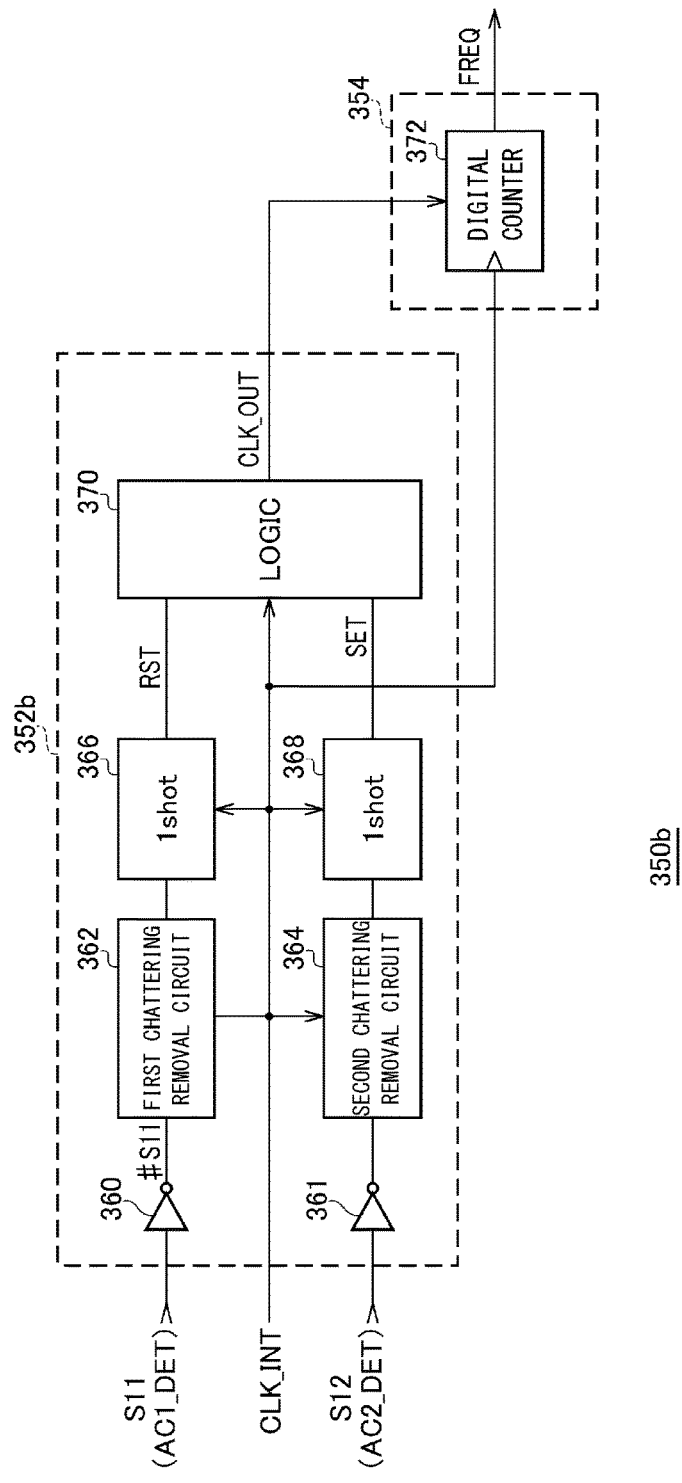
FIG. 10 is a circuit diagram showing the demodulator according to the first modification.

FIG. 10 is a circuit diagram showing a demodulator 350b according to a first modification. A clock generating circuit 352b further includes an inverter 361 that inverts the second detection signal S12, in addition to the components of the clock generating circuit 352 shown in FIG. 8A. The other configuration of the clock generating circuit 352b is the same as that shown in FIG. 8A. The clock generating circuit 352b may be configured as an asynchronous circuit.

Second Embodiment

Figure 11:
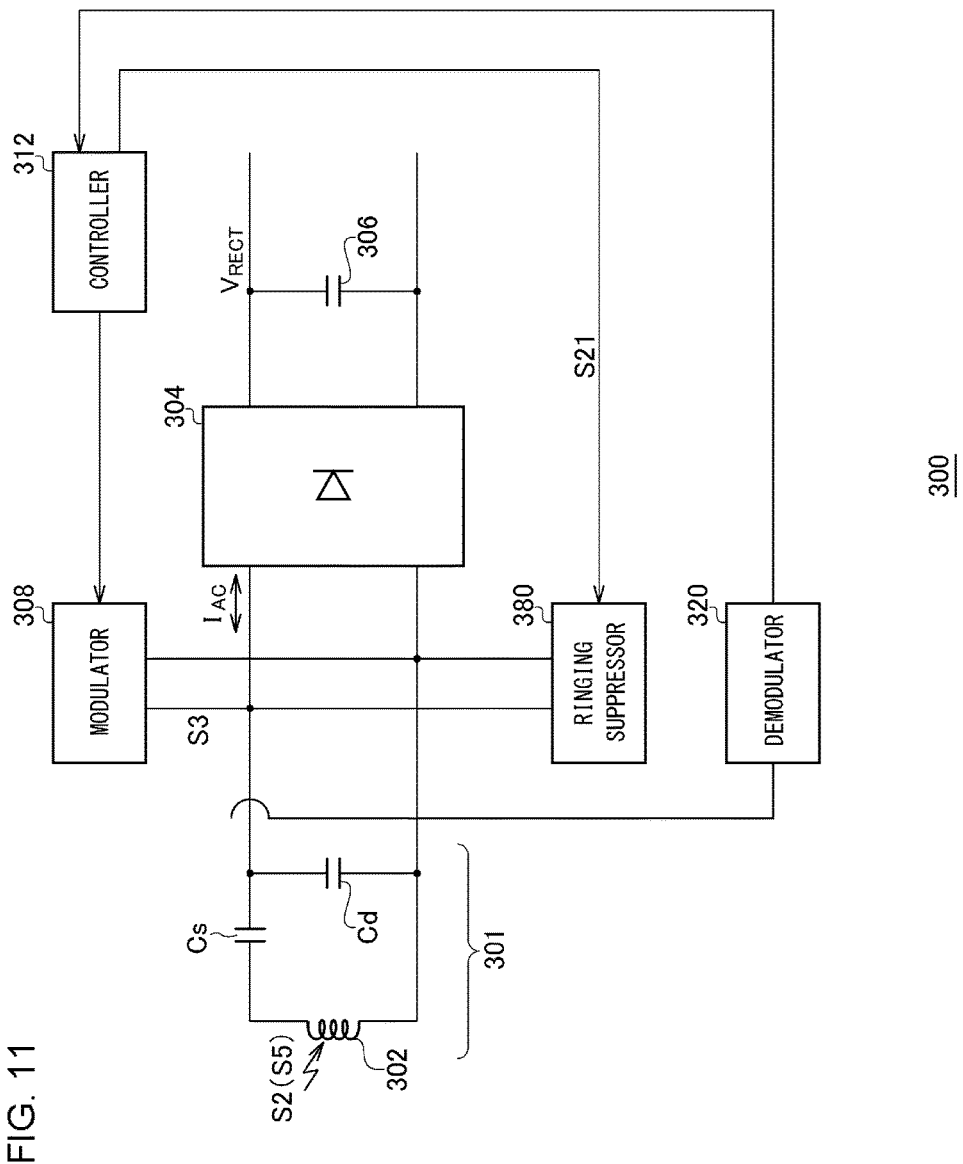
FIG. 11 is a circuit diagram showing a power receiving apparatus according to a second modification.

FIG. 11 is a circuit diagram showing a power receiving apparatus 300 according to a second embodiment. The power receiving apparatus 300 further includes a ringing suppressor 380 in addition to the components of the power receiving apparatus 300r shown in FIG. 1. Also, the second embodiment may be combined with the first embodiment. In this case, the power receiving apparatus 300 further includes such a ringing suppressor 380 in addition to the components of the power receiving apparatus including the demodulator shown in FIG. 5.

The reception antenna 301 includes a reception coil 302, a series resonance capacitor Cs, and a parallel resonance capacitor Cd. The rectifier circuit 304 rectifies the AC current $I_{AC}$ that flows through the reception antenna 301. The rectifier circuit 304 is configured as a diode bridge circuit or otherwise a synchronous rectifier circuit. A smoothing capacitor 306 smoothes the output of the rectifier circuit 304.

A demodulator 320 demodulates the electric power signal S2 including the FSK signal S5 as a superimposed signal. The ringing suppressor 380 receives, from a controller 312, a reception period signal S21 which is asserted (e.g., set to the high level) during reception of the FSK signal S5. During reception of the FSK signal S5, the ringing suppressor 380 shifts the parallel resonance frequency.

The shifted parallel resonance frequency fd' may preferably be determined so as to suppress the occurrence of ringing in the voltage across the reception antenna 301. That is to say, the shifted parallel resonance frequency fd' is not restricted to a particular value. The parallel resonance frequency fd' may be set to its optimum value by experiment or otherwise by simulation. As a result of investigation by the present inventors, the parallel resonance frequency fd' to be set during reception of the FSK signal is preferably set to a value that is closer to the transmission frequency $f_{TX}$ as compared with the parallel resonance frequency fd set in a period of non-reception of the FSK signal (in an ordinary power supply operation). For example, the following relation expression preferably holds true.

$$f_{TX} \leq fd' < fd$$

With the Qi standard, the transmission frequency $f_{TX}$ is defined to be variable ranging between 110 kHz and 205 Hz. As an example, the parallel resonance frequency fd may be set to a value on the order of 1 MHz, and the shifted parallel resonance frequency fd' may be set to a value in a range between 100 to 700 kHz. That is to say, during reception of the FSK signal, the ringing suppressor 380 shifts the parallel resonance frequency to a lower frequency.

The above is the configuration of the power receiving apparatus 300. Next, description will be made regarding the operation thereof.

During a period of reception of the FSK signal S5, the reception period signal S21 is asserted, which instructs the reception antenna 301 to shift its parallel resonance frequency fd to a value that is close to the frequency of the electric power signal S2. This suppresses the occurrence of ringing due to the back electromotive force induced at the reception coil 302, thereby allowing the demodulator 320 to receive the FSK signal with high precision.

An aspect of the present invention encompasses various kinds of apparatuses and circuits that can be regarded as a block configuration or a circuit configuration shown in FIG. 11, or otherwise that can be derived from the aforementioned description. That is to say, the present invention is not restricted to a specific circuit configuration. More specific description will be made below regarding an example configuration for clarification and ease of understanding of the essence of the present invention and the circuit operation. That is to say, the following description will by no means be intended to restrict the technical scope of the present invention.

Figure 12A:
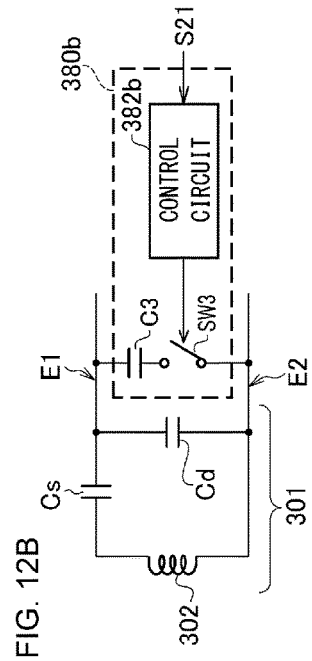
FIGS. 12A through 12D are circuit diagrams each showing example configuration of a ringing suppressor.
Figure 12B:
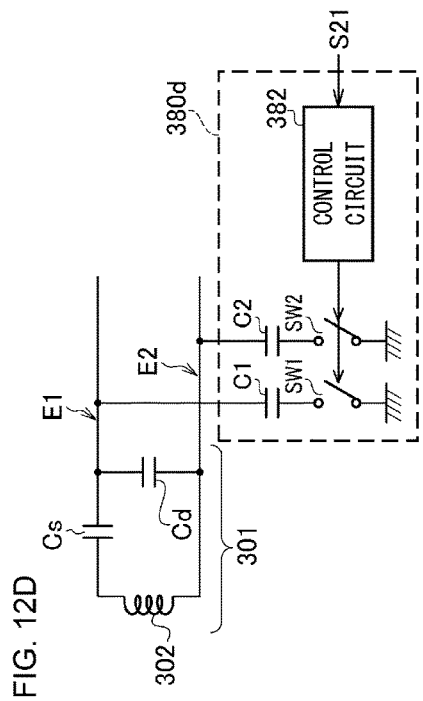
Figure 12C:
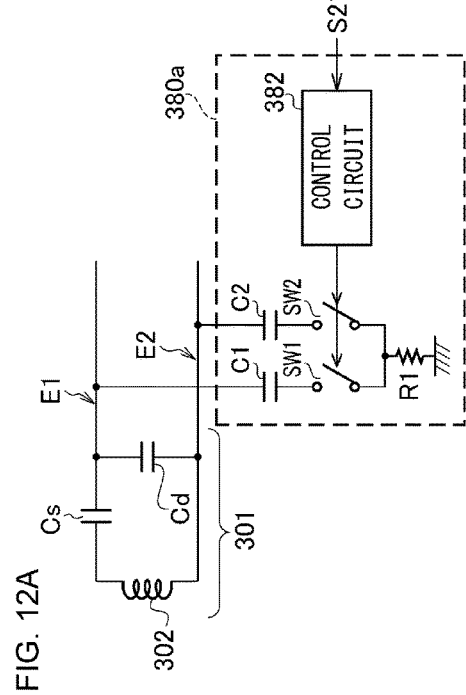
Figure 12D:
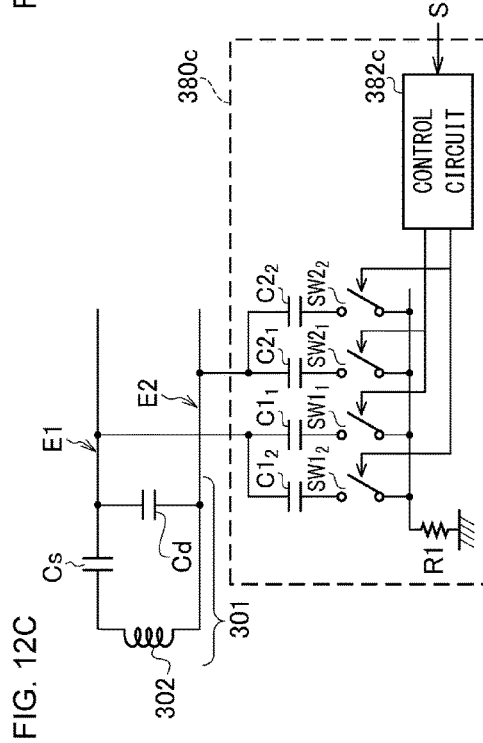

FIGS. 12A through 12D are circuit diagrams each showing an example configuration of the ringing suppressor 380. A ringing suppressor 380a shown in FIG. 12A includes a first capacitor C1, a second capacitor C2, a first switch SW1, a second switch SW2, and a resistor R1. The first capacitor C1 and the first switch SW1 are arranged in series between one end E1 of the reception antenna 301 and the ground. Furthermore, the second capacitor C2 and the second switch SW2 are arranged in series between the other end E2 of the reception antenna 301 and the ground. The resistor R1 is arranged between the ground and a connection node that connects the first switch SW1 and the second switch SW2. It should be noted that the position of the resistor R1 is not restricted in particular. Also, multiple resistors may be arranged. As shown in FIG. 12D, such a resistor R1 may be omitted.

A control circuit 382 receives the reception period signal S21 from the controller 312 that indicates reception of the FSK signal. During a period in which the reception period signal S21 is asserted, the control circuit 382a turns on the first switch SW1 and the second switch SW2.

A ringing suppressor 380b shown in FIG. 12B includes a switch SW3 and a capacitor C3. The switch SW3 and the capacitor C3 are arranged in series between both ends E1 and E2 of the reception antenna 301, and are arranged in parallel with the capacitor Cd. During a period in which the reception period signal S21 is asserted, a control circuit 382b turns on the switch SW3. It should be noted that a resistor may be arranged in series with the capacitor C3 and the switch SW3.

FIG. 12C shows a ringing suppressor 380c configured as a modification of the ringing suppressor 380a shown in FIG. 12A. The ringing suppressor 380c includes the first capacitor C1 and the second capacitor C2 each configured as a variable capacitor. Multiple (two in FIG. 12C) series connection circuits obtained by connecting the capacitor C1 and the switch SW1 in series are arranged in parallel between one end E1 of the reception antenna 301 and the ground. Similarly, multiple series connection circuits obtained by connecting the capacitor C2 and the switch SW2 in series are arranged in parallel between the other end E2 of the reception antenna 301 and the ground. Such a configuration allows the parallel resonance frequency to be switched between multiple values. Thus, such an arrangement allows an appropriate parallel resonance frequency to be selected in the FSK communication according to an operation situation of the power supply system 100. This further suppress the occurrence of ringing. Also, in the configuration shown in FIG. 12C, such a resistor R1 may be omitted.

With the Qi standard, the modulator 308 is connected to the reception antenna 301, and is configured to adjust the parallel resonance frequency fd of the reception antenna 301 according to an AM modulated signal S22. Accordingly, by controlling the AM modulator 308, i.e., by making use of the function of the AM modulator 308, such an arrangement is capable of suppressing the occurrence of ringing.

Specifically, the modulator 308 has the same configuration as that of the ringing suppressor 380a shown in FIG. 12A. FIGS. 13A and 13B are circuit diagrams showing the modulator 308 and the ringing suppressor 380. As shown in FIG. 13A, the modulator 308 includes capacitors $C_{CM1}$ and $C_{CM2}$ and switches SW11 and SW12. The switches SW11 and SW12 are switched on and off according to the AM modulated signal S22. During a period of reception of the FSK signal, the ringing suppressor 380 turns on the switches SW11 and SW12. It can be understood that the capacitors $C_{CM1}$ and $C_{CM2}$ and the switches SW11 and SW12 shown in FIG. 13A correspond to the capacitors C1 and C2 and the switches SW1 and SW2 shown in FIG. 12A. Also, it can be understood that a part of the circuit elements is shared by the modulator 308 and the ringing suppressor 380.

FIG. 13B is an example configuration of the ringing suppressor 380. The ringing suppressor 380 includes a first logic gate 384 that performs logical operation on the AM modulated signal S22 and the reception period signal S21. In a case in which assertion of the reception period signal S21 is defined as the high level, the first logic gate 384 may be configured as an OR gate. The first switch SW1 and the second switch SW2 are switched on and off according to the output signal S23 of the first logic gate 384.

During a period in which the reception period signal S21 is asserted (set to the high level), the signal S23 is set to the high level, which turns on the switch SW1 (SW2). During a period in which the reception period signal S21 is negated (set to the low level), the signal S23 is set to a level that corresponds to the AM modulated signal S22. In this state, the switch SW1 (SW2) is switched on or off according to the AM modulated signal S22.

The ringing suppressor 380 may be controlled such that it is switched between an enable mode in which the parallel resonance frequency fd can be shifted and a disable mode in which it cannot be shifted. The ringing suppressor 380 further includes a register 386 that stores control data S24 that indicates the enable mode or the disable mode. For example, when the frequency shift operation of the ringing suppressor 380 is disabled, the control data S24 is set to 1 (low level). Conversely, when the frequency shift operation of the ringing suppressor 380 is enabled, the control data S24 is set to 1 (high level). A second logic gate 388 performs logical operation on the control data S24 and the reception period signal S21. For example, the second logic gate 388 is configured as an AND gate. When the control data S24 is set to 0, the output of the second logic gate 388 is fixed to the low level regardless of the reception period signal S21. When the control data S24 is set to 1, the output of the second logic gate 388 has the same logical level as that of the reception period signal S21.

Figure 14A:
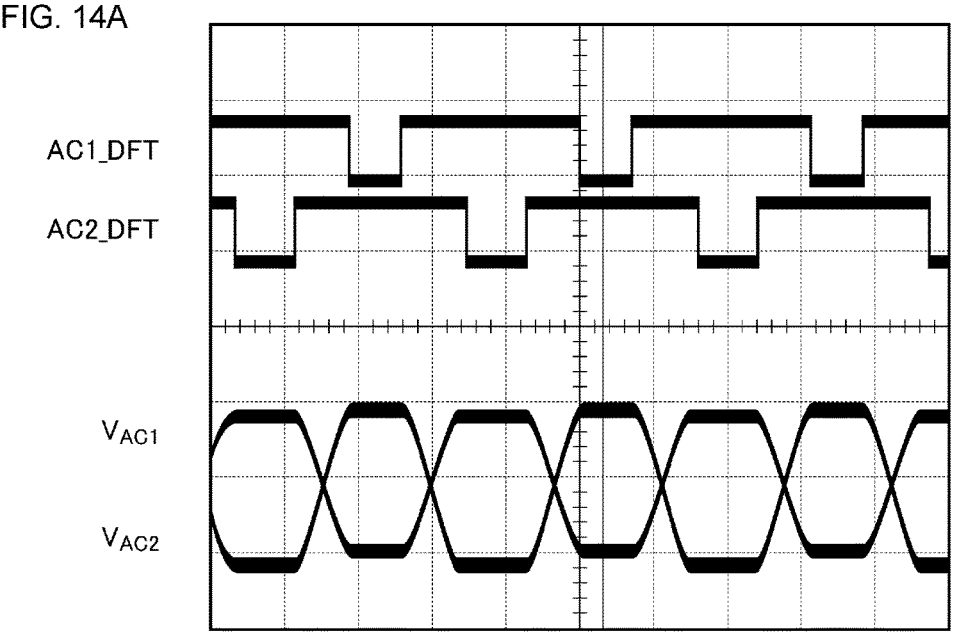
FIG. 14A is an operation waveform diagram showing the operation of the power receiving apparatus including the modulator and the ringing suppressor shown in FIG. 13A.

FIG. 14A is an operation waveform diagram showing the operation of the power receiving apparatus 300 including the modulator 308 and the ringing suppressor 380 shown in FIG. 13A. The waveforms shown in the drawing were obtained by using an oscilloscope to measure the waveforms in the power receiving apparatus 300 with respect to the voltages $V_{AC1}$ and $V_{AC2}$ at the AC1 terminal and the AC2 terminal and the AC1_DET signal and the AC2_DET signal when the switches SW11 and SW12 of the modulator 308 were turned on during a period of reception of the FSK signal. It should be noted that the AC1_DET signal and the AC2_DET signal are output signals of the comparators 334 and 336 shown in FIG. 2, respectively.

Figure 14B:
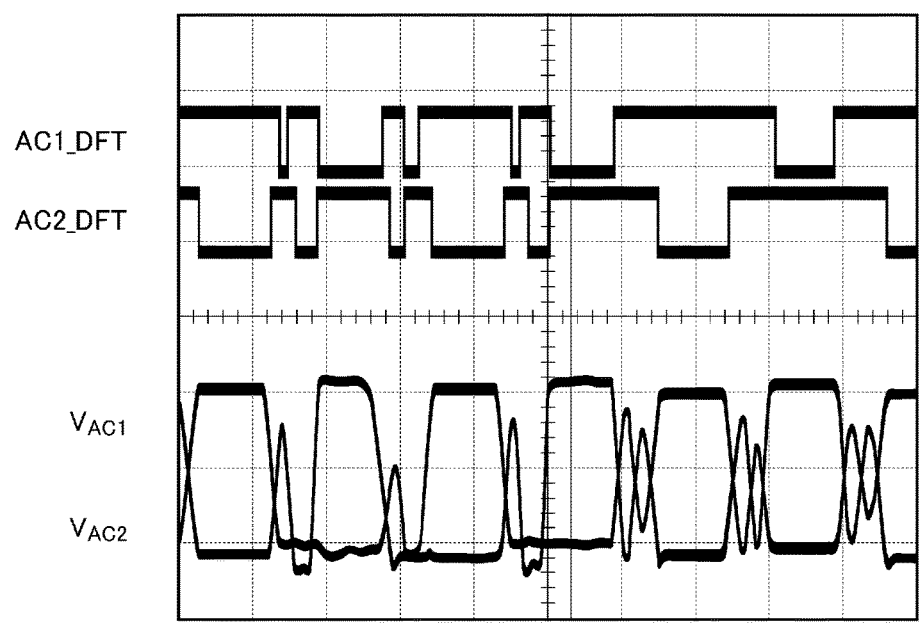
FIG. 14B is a waveform diagram for comparison purposes.

As a comparison, FIG. 14B shows the waveforms when the switches SW11 and SW12 of the modulator 308 are turned off during a period of reception of the FSK signal. As shown in the drawings, by shifting the parallel resonance frequency fd, such an arrangement is capable of suppressing the occurrence of ringing in the voltages $V_{AC1}$ and $V_{AC2}$ at the AC1 terminal and the AC2 terminal.

Figure 15:
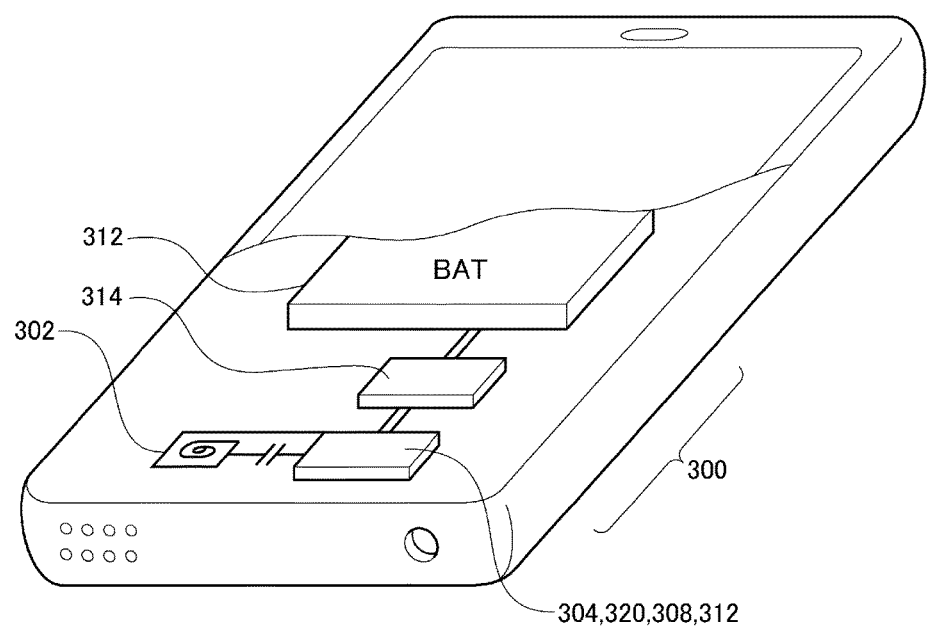
FIG. 15 is a perspective view of an electronic device including the power receiving apparatus.

[Usage] Description will be made regarding the usage of the power receiving apparatus 300 according to various embodiments described above. FIG. 15 is a perspective view showing an electronic device 500 including the power receiving apparatus 300. The electronic device 500 is configured as a battery-driven device, examples of which include cellular phone terminals, smartphones, portable audio players, digital still cameras, digital video cameras, and the like. The electronic device 500 includes the secondary battery 102 and the power receiving apparatus 300. The synchronous rectifier circuit 304, the demodulator 320, the modulator 308, the controller 312, and the charger circuit 314 may be integrated on a single semiconductor chip or otherwise on multiple semiconductor chips.

Description has been made in the embodiment regarding a wireless power transmission apparatus that conforms to the Qi standard. However, the present invention is not restricted to such an arrangement. Also, the present invention is applicable to the power receiving apparatus 300 which is to be employed in a system that is similar to the Qi standard. Also, the present invention is applicable to the power receiving apparatus 300 that conforms to other standards which will be developed in the future.

The settings of the signals, such as the high-level state and the low-level state of the signals, have been described in the present embodiments for exemplary purposes only. The settings can be freely modified, which can clearly be understood by those skilled in this art.

Description has been made regarding the present invention with reference to the embodiments using specific terms. However, the above-described embodiments show only the mechanisms and applications of the present invention for exemplary purposes only, and are by no means intended to be interpreted restrictively. Rather, various modifications and various changes in the layout can be made without departing from the spirit and scope of the present invention defined in appended claims.

What is claimed is:

1. A wireless power receiving apparatus that receives an electric power signal from a wireless power transmission apparatus, the wireless power receiving apparatus comprising:
    a reception antenna comprising a reception coil structured to receive the electric power signal;
    a rectifier circuit structured to rectify an AC current that flows through the reception antenna;
    a smoothing capacitor structured to smooth an output of the rectifier circuit; and
    a demodulator structured to demodulate the electric power signal subjected to Frequency Shift Keying (FSK) modulation,
    wherein the rectifier circuit comprises:
        an H-bridge circuit comprising a first AC input terminal coupled to the reception antenna and a second AC input terminal coupled to the reception antenna; and
        a synchronous rectification controller structured to control the H-bridge circuit,
    and wherein the demodulator comprises:
        a first comparator structured to compare a voltage at the first AC input terminal with a first threshold voltage, so as to generate a first detection signal;
        a second comparator structured to compare a voltage at the second AC input terminal with a second threshold voltage, so as to generate a second detection signal;
        a clock generating circuit structured to generate a frequency detection clock that transits according to a given edge of the first detection signal and a given edge of the second detection signal; and
        a frequency detection circuit structured to detect a frequency of the frequency detection clock,
    wherein the clock generating circuit is structured to generate the frequency detection clock according to a positive edge of the second detection signal and a subsequent negative edge of the first detection signal.

2. The wireless power receiving apparatus according to claim 1, wherein the clock generating circuit comprises:
    an inverter structured to invert the first detection signal; and
    a logic circuit structured to generate the frequency detection clock according to the second detection signal and the first detection signal inverted by the inverter.

3. The wireless power receiving apparatus according to claim 2, wherein the clock generating circuit is structured to perform retiming of the inverted first detection signal and the second detection signal using an internal clock.

4. The wireless power receiving apparatus according to claim 3, wherein the clock generating circuit further comprises:
    a first chattering removal circuit structured to judge that a valid transition of the first detection signal has occurred in the first detection signal when the first detection signal remains at the same level over M cycles (M represents an integer of 2 or more) of the internal clock; and
    a second chattering removal circuit structured to judge that a valid transition of the second detection signal has occurred in the second detection signal when the second detection signal remains at the same level over N cycles (N represents an integer of 2 or more) of the internal clock.

5. The wireless power receiving apparatus according to claim 3, wherein the frequency detection circuit is structured to measure the frequency of the frequency detection clock using the internal clock.

6. The wireless power receiving apparatus according to claim 1, wherein the clock generating circuit comprises:
    a first one-shot circuit arranged on a path of the inverted first detection signal; and
    a second one-shot circuit arranged on a path of the second detection signal.

7. The wireless power receiving apparatus according to claim 1, wherein the synchronous rectification controller is structured to control the H-bridge circuit based on the first detection signal and the second detection signal.

8. The wireless power receiving apparatus according to claim 1, that conforms to the Qi standard.

9. An electronic device comprising the wireless power receiving apparatus according to claim 1.

10. A wireless power receiving apparatus that receives an electric power signal from a wireless power transmission apparatus, the wireless power receiving apparatus comprising:

a reception antenna comprising a reception coil structured to receive the electric power signal;

a rectifier circuit structured to rectify an AC current that flows through the reception antenna;

a smoothing capacitor structured to smooth an output of the rectifier circuit; and a demodulator structured to demodulate the electric power signal subjected to Frequency Shift Keying (FSK) modulation, wherein the rectifier circuit comprises:

an H-bridge circuit comprising a first AC input terminal coupled to the reception antenna and a second AC input terminal coupled to the reception antenna; and a synchronous rectification controller structured to control the H-bridge circuit, and wherein the demodulator comprises:

a first comparator structured to compare a voltage at the first AC input terminal with a first threshold voltage, so as to generate a first detection signal;

a second comparator structured to compare a voltage at the second AC input terminal with a second threshold voltage, so as to generate a second detection signal;

a clock generating circuit structured to generate a frequency detection clock that transits according to a given edge of the first detection signal and a given edge of the second detection signal; and a frequency detection circuit structured to detect a frequency of the frequency detection clock, wherein the clock generating circuit is structured to generate the frequency detection clock according to a negative edge of the second detection signal and a subsequent negative edge of the first detection signal.

11. A wireless power receiving apparatus that receives an electric power signal from a wireless power transmission apparatus, the wireless power receiving apparatus comprising:

a reception antenna comprising a reception coil structured to receive the electric power signal;

a rectifier circuit structured to rectify an AC current that flows through the reception antenna;

a smoothing capacitor structured to smooth an output of the rectifier circuit;

a demodulator structured to demodulate the electric power signal subjected to Frequency Shift Keying (FSK) modulation; and a ringing suppressor structured to shift a parallel resonance frequency of the reception antenna during reception of an FSK signal, wherein the rectifier circuit comprises:

an H-bridge circuit that comprises a first AC input terminal coupled to the reception antenna and a second AC input terminal coupled to the reception antenna; and a synchronous rectification controller structured to control the H-bridge circuit, wherein the demodulator comprises:

a first comparator structured to compare a voltage at the first AC input terminal with a first threshold voltage, so as to generate a first detection signal;

a second comparator structured to compare a voltage at the second AC input terminal with a second threshold voltage, so as to generate a second detection signal;

a clock generating circuit structured to generate a frequency detection clock that transits according to a given edge of the first detection signal and a given edge of the second detection signal;

a frequency detection circuit structured to detect the frequency of the frequency detection clock, and wherein the clock generating circuit is structured to generate the frequency detection clock according to a positive edge of the second detection signal and a subsequent negative edge of the first detection signal.

12. The wireless power receiving apparatus according to claim 11, wherein the ringing suppressor comprises:

a first capacitor and a first switch arranged in series between one end of the reception antenna and a ground;

a second capacitor and a second switch arranged in series between the other end of the reception antenna and the ground; and a control circuit structured to control the first switch and the second switch.

13. The wireless power receiving apparatus according to claim 12, wherein the ringing suppressor further comprises a resistor arranged between the ground and a connection node that connects the first switch and the second switch.

14. The wireless power receiving apparatus according to claim 11, further comprising an AM modulator structured to change the parallel resonance frequency of the reception antenna according to an AM modulated signal, wherein the ringing suppressor is structured to control the AM modulator.

15. The wireless power receiving apparatus according to claim 14, wherein the AM modulator comprises:

a first capacitor and a first switch arranged in series between one end of the reception antenna and the ground; and a second capacitor and a second switch arranged in series between the other end of the reception antenna and the ground, wherein the ringing suppressor comprises a logic gate structured to perform logical operation on the AM modulated signal and a reception period signal that indicates a period of reception of the FSK signal, and wherein the ringing suppressor is structured to control the first switch and the second switch based on an output signal of the logic gate.

16. The wireless power receiving apparatus according to claim 11, wherein the clock generating circuit comprises:

an inverter structured to invert the first detection signal; and a logic circuit structured to generate the frequency detection clock according to the second detection signal and the first detection signal inverted by the inverter.

17. The wireless power receiving apparatus according to claim 16, wherein the clock generating circuit is structured to perform retiming of the inverted first detection signal and the second detection signal using an internal clock.

18. The wireless power receiving apparatus according to claim 17, wherein the clock generating circuit further comprises:

a first chattering removal circuit structured to judge that a valid transition of the first detection signal has occurred in the first detection signal when the first detection signal remains at the same level over M cycles (M represents an integer of 2 or more) of the internal clock; and a second chattering removal circuit structured to judge that a valid transition of the second detection signal has occurred in the second detection signal when the second detection signal remains at the same level over N cycles (N represents an integer of 2 or more) of the internal clock.

19. The wireless power receiving apparatus according to claim 17, wherein the frequency detection circuit is structured to measure the frequency of the frequency detection clock using the internal clock.

20. The wireless power receiving apparatus according to claim 11, wherein the clock generating circuit comprises:
   a first one-shot circuit arranged on a path of the inverted first detection signal; and
   a second one-shot circuit arranged on a path of the second detection signal.

21. The wireless power receiving apparatus according to claim 11, wherein the synchronous rectification controller is structured to control the H-bridge circuit based on the first detection signal and the second detection signal.

22. The wireless power receiving apparatus according to claim 11, that conforms to the Qi standard.

23. An electronic device comprising the wireless power receiving apparatus according to claim 11.

24. A wireless power receiving apparatus that receives an electric power signal from a wireless power transmission apparatus, the wireless power receiving apparatus comprising:
   a reception antenna comprising a reception coil structured to receive the electric power signal;
   a rectifier circuit structured to rectify an AC current that flows through the reception antenna;
   a smoothing capacitor structured to smooth an output of the rectifier circuit;
   a demodulator structured to demodulate the electric power signal subjected to Frequency Shift Keying (FSK) modulation; and
   a ringing suppressor structured to shift a parallel resonance frequency of the reception antenna during reception of an FSK signal,
   wherein the rectifier circuit comprises:
      an H-bridge circuit that comprises a first AC input terminal coupled to the reception antenna and a second AC input terminal coupled to the reception antenna; and
      a synchronous rectification controller structured to control the H-bridge circuit, wherein the demodulator comprises:
      a first comparator structured to compare a voltage at the first AC input terminal with a first threshold voltage, so as to generate a first detection signal;
      a second comparator structured to compare a voltage at the second AC input terminal with a second threshold voltage, so as to generate a second detection signal;
      a clock generating circuit structured to generate a frequency detection clock that transits according to a given edge of the first detection signal and a given edge of the second detection signal;
      a frequency detection circuit structured to detect the frequency of the frequency detection clock, and
   wherein the clock generating circuit is structured to generate the frequency detection clock according to a negative edge of the second detection signal and a subsequent negative edge of the first detection signal.

* * * * *